US012798900B2

(12) United States Patent
Ji et al.

(10) Patent No.: US 12,798,900 B2
(45) Date of Patent: Nov. 17, 2026

(54) PICK AND PLACE APPARATUS FOR PICKING AND PLACING SEMICONDUCTOR PACKAGE ALONG OPTIMAL PATH BY CONTROLLING A PICKER TOOL

(71) Applicant: Samsung Electronics Co., Ltd., Suwon-si (KR)

(72) Inventors: Minkyung Ji, Suwon-si (KR); Jiyoung Kim, Suwon-si (KR); Sunghyun Kim, Suwon-si (KR); Jonghyun Park, Suwon-si (KR); Dongsoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 230 days.

(21) Appl. No.: 18/768,375

(22) Filed: Jul. 10, 2024

(65) Prior Publication Data

US 2025/0232991 A1 Jul. 17, 2025

(30) Foreign Application Priority Data

Jan. 15, 2024 (KR) ........................ 10-2024-0006102

(51) Int. Cl.
*B65G 47/90* (2006.01)

(52) U.S. Cl.
CPC .................................. *B65G 47/905* (2013.01)

(58) Field of Classification Search
CPC .................................................. G01R 31/2896
See application file for complete search history.

(56) References Cited

U.S. PATENT DOCUMENTS 9,586,325 B2 3/2017 Truyens
10,783,462 B1 9/2020 Mo et al.
2004/0181961 A1* 9/2004 Hwang .............. G01R 31/2867 34/92
2006/0066293 A1* 3/2006 Gopal ................ G01R 31/2867 324/750.14
2007/0013404 A1* 1/2007 Yoon .................. G01R 31/2896 324/759.03
2008/0238470 A1* 10/2008 Na ..................... G01R 31/2893 324/757.04
2010/0229660 A1* 9/2010 Yo ...................... G01R 31/2893 73/864.31

(Continued)

FOREIGN PATENT DOCUMENTS

JP 3475836 B2 12/2003
JP 5898446 B2 4/2016
JP 2019-216194 A 12/2019

(Continued)

*Primary Examiner* — Suresh Suryawanshi
(74) *Attorney, Agent, or Firm* — Fish & Richardson P.C.

(57) ABSTRACT

A pick and place apparatus according to some example embodiments includes a first tray configured to accommodate a plurality of semiconductor packages, a test socket unit having a plurality of test sockets each configured to test a semiconductor package, a picker tool having a plurality of pickers configured to pick up corresponding semiconductor packages from the first tray and place the picked semiconductor packages on the plurality of test sockets, and a controller configured to check whether the plurality of test sockets are normal and to block a semiconductor package pickup function of a picker corresponding to an abnormal test socket.

20 Claims, 33 Drawing Sheets

(56) References Cited

U.S. PATENT DOCUMENTS

| | | | | |
|---|---|---|---|---|
| 2022/0128598 | A1 * | 4/2022 | Bruno | G01R 1/045 |
| 2023/0126461 | A1 | 4/2023 | Li et al. | |

FOREIGN PATENT DOCUMENTS

| | | | | | |
|---|---|---|---|---|---|
| JP | 6916606 | B2 | | 8/2021 | |
| JP | 7062041 | B1 | | 5/2022 | |
| KR | 10-1606334 | B1 | | 3/2016 | |
| KR | 20170087750 | A | * | 7/2017 | G01R 31/2867 |
| KR | 10-2297955 | B1 | | 9/2021 | |
| KR | 20230106350 | A | * | 7/2023 | G01R 31/2865 |
| KR | 20230140146 | A | * | 10/2023 | H10P 72/78 |

* cited by examiner

FIG. 12

| FIRST NUMBER | 0 | 1 | 2 | 3 | 0 | ····· | N | PICK AND PLACE TIME |
|---|---|---|---|---|---|---|---|---|
| PACKAGE POSITION (X, Y) | (7, 0) | (2, 1) | (7, 2) | (2, 3) | (7, 4) | | (2, 5) | |
| 1st COMBINATION | 6 | 9 | 5 | 8 | 12 | | 2 | 10 SECONDS |
| 2nd COMBINATION | 0 | 2 | 6 | 13 | 11 | | 1 | 9.5 SECONDS |
| 3rd COMBINATION | 3 | 1 | 12 | 13 | 0 | | 6 | 11 SECONDS |
| 4th COMBINATION | 13 | 12 | 0 | 6 | 3 | | 2 | 15 SECONDS |
| ⋮ | | | | | | | | |
| Nth COMBINATION | 0 | 1 | 13 | 12 | 11 | | 9 | 5 SECONDS |

FIG. 13A

| | PICK AND PLACE TIME | SELECTION PROBABILITY |
|---|---|---|
| 1st COMBINATION | 10 SECONDS | 17.7% |
| 2nd COMBINATION | 9.5 SECONDS | 18.7% |
| 3rd COMBINATION | 11 SECONDS | 16.2% |
| 4th COMBINATION | 15 SECONDS | 11.9% |
| 5th COMBINATION | 5 SECONDS | 35.5% |

PICK AND PLACE APPARATUS FOR PICKING AND PLACING SEMICONDUCTOR PACKAGE ALONG OPTIMAL PATH BY CONTROLLING A PICKER TOOL

CROSS-REFERENCE TO RELATED APPLICATION

This application is based on and claims priority under 35 U.S.C. § 119 to Korean Patent Application No. 10-2024-0006102, filed on Jan. 15, 2024, in the Korean Intellectual Property Office, the disclosure of which is incorporated by reference herein in its entirety.

BACKGROUND

The inventive concepts relate to a pick and place apparatus, and more particularly, to a pick and place apparatus capable of picking and placing a semiconductor package along an optimal path.

In general, a semiconductor manufacturing process includes a fabrication (FAB) process of forming a plurality of semiconductor chips on a wafer, an electric die sorting (EDS) process of testing the electrical characteristics of each semiconductor chip formed on the wafer, an assembly process of individually segmenting good semiconductor chips determined by the EDS process and then packaging devices such that the semiconductor chips are protected from external mechanical, physical, and chemical impacts, and a package test process of performing an electrical function test (a final test) before a processed semiconductor package is delivered to a user.

To transfer a semiconductor package in each semiconductor process, a transport means called a tray may be used. The tray has a structure accommodating a plurality of semiconductor devices in a matrix form in a horizontal direction.

A pick and place apparatus may pick up a semiconductor package accommodated in a tray and transferred and place the picked semiconductor package on a test socket or a test board, and after a test ends, pick up the semiconductor package accommodated in the test socket or the test board and place the picked semiconductor package on another tray.

SUMMARY

Some example embodiments of the present inventive concepts provide a pick and place apparatus capable of picking and placing a semiconductor package along an optimal path.

Further, the problems to be solved by example embodiments of the present inventive concepts are not limited to the problem mentioned above, and other problems could be clearly understood by those of ordinary skill in the art from the description below.

According to some example embodiments, there is provided a pick and place apparatus including a first tray configured to accommodate a plurality of semiconductor packages, a test socket unit having a plurality of test sockets each configured to test a semiconductor package, a picker tool having a plurality of pickers configured to pick up corresponding semiconductor packages from the first tray and place the picked semiconductor packages on the plurality of test sockets, and a controller configured to check whether the plurality of test sockets are normal and block a semiconductor package pickup function of a picker corresponding to an abnormal test socket, check whether there are remaining semiconductor packages remaining in the first tray without being transferred, calculate, according to a first operation and a second operation, a time the picker tool picks and places the remaining semiconductor packages, select an operation having a shortest time between a first time calculated according to the first operation and a second time calculated according to the second operation, and control the picker tool to pick up the remaining semiconductor packages according to the selected operation.

According to some example embodiments, there is provided a pick and place apparatus including a plurality of test sockets configured to test a plurality of semiconductor packages accommodated in a tray and transferred to the plurality of test sockets, a plurality of pickers configured to pick and place the plurality of semiconductor packages, and a controller configured to block a function of picking and placing a semiconductor package with respect to pickers corresponding to test sockets having an abnormal test function among the plurality of test sockets, select an operation taking a less pick and place time between a first operation and a second operation capable of picking and placing remaining semiconductor packages remaining in the tray as a result of the pick and place function of the pickers being blocked while pickers corresponding to test sockets having a normal test function pick and place semiconductor packages accommodated in the tray, the first operation being an operation of searching for a position from which a maximum number of remaining semiconductor packages are picked up at once, and the second operation being an operation of picking up the remaining semiconductor packages on the tray based on a genetic algorithm.

According to some example embodiments, there is provided a pick and place apparatus including a first tray configured to accommodate a plurality of semiconductor packages, a test socket unit having a plurality of test sockets configured to respectively test semiconductor packages, a second tray configured to accommodate semiconductor packages confirmed as good products as a test result, a third tray configured to accommodate semiconductor packages confirmed as bad products as a test result, a picker tool having a plurality of pickers configured to pick up semiconductor packages from the first tray and place the picked semiconductor packages on the plurality of test sockets, and pick up the semiconductor packages having ended the test from the plurality of test sockets and place the picked semiconductor packages on the second tray or the third tray, and a controller configured to check whether the plurality of test sockets are normal, block a semiconductor package pickup function of pickers corresponding to abnormal test sockets, check whether there are remaining semiconductor packages remaining in the first tray without being transferred, calculate, according to a first operation and a second operation, a time by which the picker tool is configured to pick the remaining semiconductor packages, select an operation taking a shortest time between a first time calculated according to the first operation and a second time calculated according to the second operation, and control the picker tool to pick up the remaining semiconductor packages according to the selected operation.

BRIEF DESCRIPTION OF THE DRAWINGS

Example embodiments of the present inventive concepts will be more clearly understood from the following detailed description taken in conjunction with the accompanying drawings in which:

FIG. 12 is a table representing a first set consisting of a plurality of combinations generated by matching second numbers assigned to pickers with first numbers assigned to remaining semiconductor packages;

FIG. 13A is a table representing the pick and place times and selection probabilities of combinations belonging to the first set according to some example embodiments.

DETAILED DESCRIPTION

Figure 1:
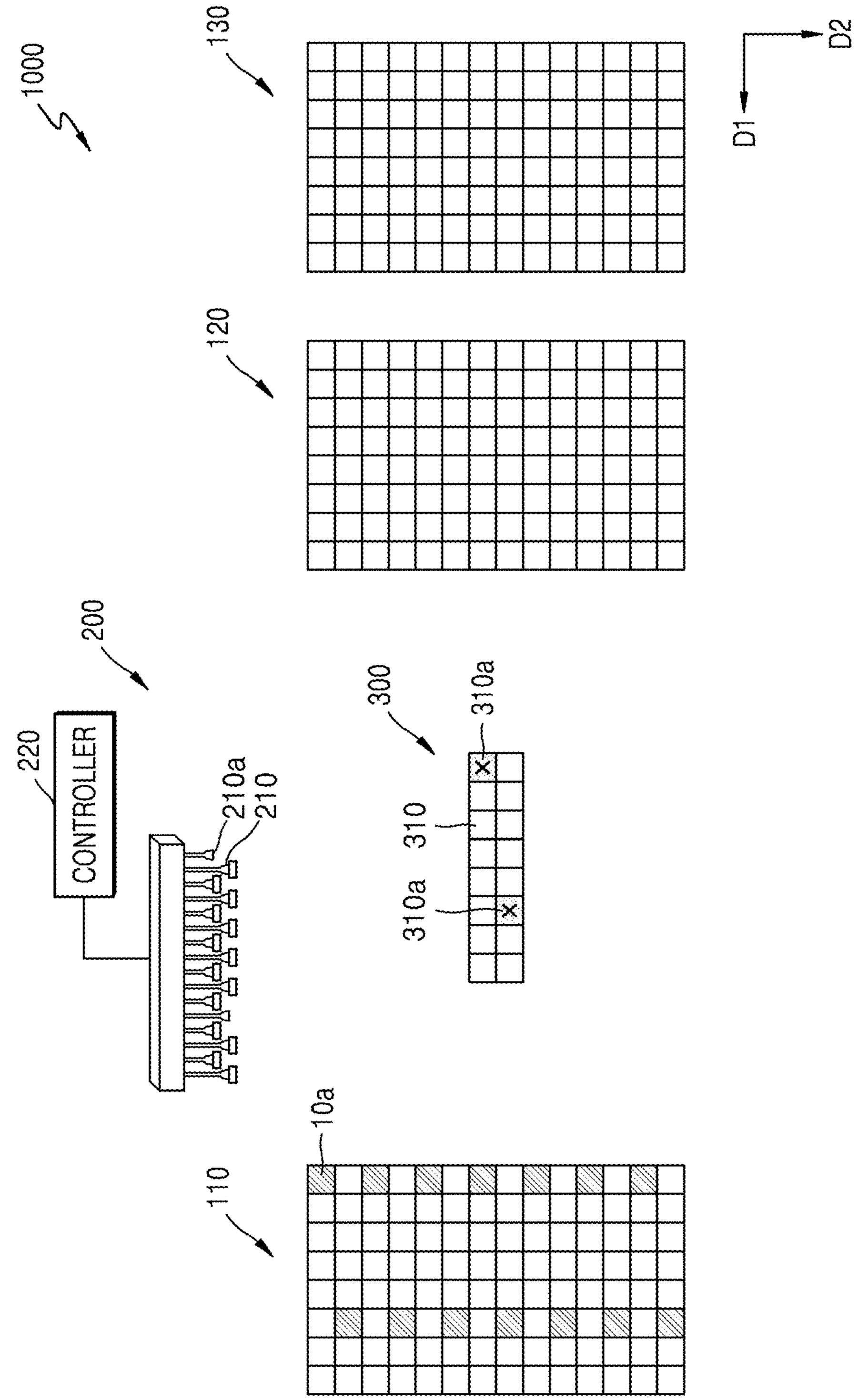
FIG. 1 is a conceptual diagram schematically illustrating a pick and place apparatus according to some example embodiments.

Hereinafter, example embodiments are described in detail with reference to the accompanying drawings. Like reference numerals in the drawings denote like elements, and thus their repetitive description will be omitted.

FIG. 1 is a conceptual diagram schematically illustrating a pick and place apparatus 1000 according to some example embodiments.

The pick and place apparatus 1000 according to some example embodiments may include, for example, a first tray 110, a second tray 120, a third tray 130, a picker tool 200, a controller 220, and a test socket unit 300.

The pick and place apparatus 1000 according to some example embodiments may allow the picker tool 200 to pick up semiconductor packages accommodated in the first tray (e.g., a process-side tray) 110 positioned at a standby point and then place the picked semiconductor packages on the test socket unit (or a test board) 300 or the second tray (e.g., a shipping-side tray) 120 positioned at a target point.

The picker tool 200 may have a plurality of pickers 210, wherein each picker 210 may pick up a semiconductor package loaded on the first tray 110 and place the picked semiconductor package on a test socket 310 of the test socket unit 300. After a test ends, the picker tool 200 may pick up the semiconductor package loaded on the test socket 310 and place the picked semiconductor package on the second tray 120.

In a first direction D1, the picker tool 200 may have the same number of pickers 210 as the load capacity of the first tray 110, e.g., the number of semiconductor packages loaded on the accommodation ports of the first tray 110. Referring to FIG. 1, the first tray 110 may load eight semiconductor packages thereon in the first direction D1, and accordingly, the picker tool 200 may have eight pickers 210 in the first direction D1.

In a second direction D2 that is perpendicular to the first direction D1, the number of pickers 210 included in the picker tool 200 may be less than or equal to the load capacity of the first tray 110. Referring to FIG. 1, the load capacity of the first tray 110 in the second direction D2 may be 14, and the number of pickers 210 of the picker tool 200 in the second direction D2 may be 2. It will be understood that elements and/or properties thereof (e.g., structures, surfaces, directions, or the like), which may be referred to as being "perpendicular," "parallel," "coplanar," or the like with regard to other elements and/or properties thereof (e.g., structures, surfaces, directions, or the like) may be "perpendicular," "parallel," "coplanar," or the like or may be "substantially perpendicular," "substantially parallel," "substantially coplanar," respectively, with regard to the other elements and/or properties thereof.

The test socket unit 300 may include a plurality of test sockets 310. The plurality of test sockets 310 may load thereon semiconductor packages transferred by the picker tool 200 and perform various kinds of tests on the semiconductor packages.

The test socket unit 300 may include the plurality of test sockets 310 arranged in the first direction D1 and the second direction D2. For example, the number of test sockets 310 arranged in the first direction D1 may be the same as the load capacity of the first tray 110 in the first direction D1, and the number of test sockets 310 arranged in the second direction D2 may be less than the load capacity of the first tray 110 in the second direction D2.

Compared to the picker tool 200, the number of test sockets 310 arranged in the first direction D1 may be the same as the number of pickers 210 of the picker tool 200 arranged in the first direction D1, and the number of test sockets 310 arranged in the second direction D2 may be the same as the number of pickers 210 of the picker tool 200 arranged in the second direction D2.

The second tray 120 and the third tray 130 may be shipping-side trays. In some example embodiments, semiconductor packages on which a test has ended by the test socket unit 300 may be identified as good products and bad products. Semiconductor packages identified as good products may be picked up by the picker tool 200 and placed on the second tray 120 and semiconductor packages identified as bad products may be picked up by the picker tool 200 and placed on the third tray 130.

The controller 220 may check whether the plurality of test sockets 310 are normal and block a semiconductor package pickup function with respect to pickers 210 of the picker tool 200 corresponding to abnormal test sockets 310*a*.

Among the plurality of test sockets 310 included in the test socket unit 300, there may be test sockets 310 which cannot test a semiconductor package due to an abnormality, such as an internal fault. Because semiconductor packages loaded on the abnormal test sockets 310*a* cannot be tested to be good or bad, after the test, the semiconductor packages cannot be classified as good products and/or bad products.

According to some example embodiments, the controller 220 may check whether the plurality of test sockets 310 are normal before picking up semiconductor packages from the first tray 110. The controller 220 may control pickers 210*a* of the picker tool 200 corresponding to abnormal test sockets 310*a* not to pick up semiconductor packages from the first tray 110 such that semiconductor packages are not placed on the abnormal test sockets 310*a*.

In some example embodiments, when the numbers of test sockets 310 of the test socket unit 300 in the first direction D1 and the second direction D2 are respectively the same as the numbers of pickers 210 of the picker tool 200 in the first direction D1 and the second direction D2, the plurality of test sockets 310 of the test socket unit 300 one-to-one correspond to the plurality of pickers 210 of the picker tool 200, and thus, the controller 220 may select the pickers 210*a* of the picker tool 200 corresponding to the abnormal test sockets 310*a*.

Accordingly, the controller 220 may control only pickers 210 of the picker tool 200 corresponding to normal test sockets 310 to pick up semiconductor packages from the first tray 110 and place the picked semiconductor packages on the normal test sockets 310 and control the pickers 210*a* of the picker tool 200 corresponding to the abnormal test sockets 310*a* not to pick up semiconductor packages. Non-picked semiconductor packages 10*a* may remain in the first tray 110.

The controller 220 may check whether there are remaining semiconductor packages 10*a* remaining in the first tray 110 without being transferred. For example, the controller 220 may check whether there is a remaining semiconductor packages 10*a* remaining in the first tray 110 that has not been transferred. As described above, in some example embodiments, before pick-and-place is performed by the picker tool 200, the controller 220 may check whether the plurality of test sockets 310 of the test socket unit 300 are normal and block the pickup function of the pickers 210*a* of the picker tool 200 corresponding to the abnormal test sockets 310*a*. While blocking the pickup function of the pickers 210*a*, the picker tool 200 may pick up semiconductor packages from the first tray 110 and place the picked semiconductor packages on the test socket unit 300. Thereafter, the controller 220 may check whether there are the remaining semiconductor packages 10*a* in the first tray 110.

After checking that there are remaining semiconductor packages 10*a* in the first tray 110, the controller 220 may simulate and calculate, according to a first method and a second method, a time by which the picker tool 200 picks up the remaining semiconductor packages 10*a*, compare a first time calculated according to the first method to a second time calculated according to the second method, select a method taking the shortest time between the first time and the second time, and control the picker tool 200 to pick up the remaining semiconductor packages 10*a* according to the selected method. As referred to herein, the first time calculated according to the first method, the second time calculated according to the second method, and the method taking the shortest time, may be referred to interchangeably as the first time calculated according to the first operation, the second time calculated according to the second operation, and the operation taking the shortest time.

According to some example embodiments, because a test on the remaining semiconductor packages 10*a* is not performed due to the abnormal test sockets 310*a*, it may be preferable that the test on the remaining semiconductor packages 10*a* is performed by normal test sockets 310. Because the remaining semiconductor packages 10*a* may separately remain in the first tray 110, there may be various methods by which the picker tool 200 picks up the remaining semiconductor packages 10*a*, and a pick and place time may vary according to the methods.

The controller 220 may calculate times taken according to the first method and the second method before picking and placing the remaining semiconductor packages 10*a* and pick and place the remaining semiconductor packages 10*a* according to a method taking the shortest time, thereby reducing a process time.

The controller 220 may calculate the first time according to the first method described below.

The controller 220 may compare the number of remaining semiconductor packages 10*a* which the picker tool 200 is able to pick up at a certain position to the maximum number of remaining semiconductor packages 10*a* which the picker tool 200 is able to pick up.

The picker tool 200 may move by a certain distance above the first tray 110 and then pick up remaining semiconductor packages 10*a*. The picker tool 200 may move by one accommodation space of the first tray 110, in which one semiconductor package is accommodated, in the first direction D1 or the second direction D2. Remaining semiconductor packages 10*a* existing in a region of the first tray 110 overlapping an orthogonal projection region of the picker tool 200 while the picker tool 200 moves above the first tray 110 may correspond to remaining semiconductor packages 10*a* which the picker tool 200 is able to pick up at a certain position.

The controller 220 may check the number of remaining semiconductor packages 10*a* which the picker tool 200 is able to pick up while virtually moving the picker tool 200 by one accommodation space of the first tray 110 in the first direction D1.

The controller 220 may set the number of pickers 210*a* having a blocked pickup function as the maximum number of remaining semiconductor packages 10*a* which the picker tool 200 is able to pick up. As described above, in some example embodiments, before pick-and-place is performed by the picker tool 200, the controller 220 may check whether the plurality of test sockets 310 of the test socket unit 300 are normal and block the pickup function of the pickers 210*a* of the picker tool 200 corresponding to the abnormal test sockets 310*a*. Because the plurality of pickers 210 of the picker tool 200 one-to-one correspond to the plurality of test sockets 310 of the test socket unit 300, the pickup function of the pickers 210*a* corresponding to the abnormal test sockets 310*a* is blocked and semiconductor packages corresponding to the pickers 210*a* remain in the first tray 110. Because the remaining semiconductor packages 10*a* are picked up by pickers 210 usable to pick up except for the pickers 210*a* having a blocked pickup function, the maximum number of remaining semiconductor packages 10*a* which the picker tool 200 is able to pick up at once may be the number of pickers 210*a* having a blocked pickup function.

In some example embodiments, if the maximum number of remaining semiconductor packages 10*a* which the picker tool 200 is able to pick up is greater than the number of remaining semiconductor packages 10*a* which the picker tool 200 is able to pick up at a certain position, the controller 220 may move the picker tool 200 in the first direction D1 or the second direction D2. Because picking up at once the maximum number of remaining semiconductor packages 10*a* which the picker tool 200 is able to pick up may reduce a pick and place time rather than picking up one remaining semiconductor package 10*a* at once, the controller 220 may move the picker tool 200 in the first direction D1 or the second direction D2 to find out a position where the maximum number of remaining semiconductor packages 10*a* which the picker tool 200 is able to pick up may be picked up at once.

In some example embodiments if the maximum number of remaining semiconductor packages 10*a* which the picker tool 200 is able to pick up is the same as the number of remaining semiconductor packages 10*a* which the picker tool 200 is able to pick up at a current position, the controller 220 may control the picker tool 200 to virtually pick up the remaining semiconductor packages 10*a*.

For example, when the controller 220 moves the picker tool 200 in the first direction D1, if a moved distance of the picker tool 200 in the first direction D1 is less than the length of the first tray 110 in the first direction D1, the controller 220 may relatively move the picker tool 200 in the first direction D1 with respect to the first tray 110. In some example embodiments, if the moved distance of the picker tool 200 in the first direction D1 is greater than or equal to the length of the first tray 110 in the first direction D1, the controller 220 may relatively move the picker tool 200 in the second direction D2 that is perpendicular to the first direction D1 with respect to the first tray 110.

By controlling the movement of the picker tool 200 as described above according to some example embodiments, the controller 220 may obtain the shortest-moving path of the picker tool 200 to obtain the shortest pick and place time for the remaining semiconductor packages 10*a*.

The controller 220 may calculate a time to be taken until the pickers 210 of the picker tool 200 cannot pick up any more remaining semiconductor package 10*a* because all the pickers 210 have picked up remaining semiconductor packages 10*a* or there is no remaining semiconductor package 10*a* in the first tray 110. This calculated time may be the first time according to the first method.

The controller 220 may calculate the second time according to the second method described below.

The controller 220 may respectively assign first numbers to the remaining semiconductor packages 10*a*, respectively assign second numbers to the pickers 210 of the picker tool 200, and generate a first set consisting of a plurality of combinations obtained by matching the second numbers to each of the first numbers.

The controller 220 may sequentially assign the first numbers to the remaining semiconductor packages 10*a* in the first tray 110 from the right to the left and from the top to the bottom.

For example, referring to FIG. 1, the controller 220 may assign 0 to the remaining semiconductor package 10*a* at the top right of the first tray 110, assign 1 to the remaining semiconductor package 10*a* on the next row in the second direction D2, assign 2 to the remaining semiconductor package 10*a* on the next row in the second direction D2, and finally assign 13 to the remaining semiconductor package 10*a* on the last row in the second direction D2.

The controller 220 may sequentially assign the second numbers to the pickers 210 of the picker tool 200 from the right to the left and from the top to the bottom. When the second numbers are assigned to the pickers 210 of the picker tool 200, the second numbers may not be assigned to the pickers 210*a* having a blocked pickup function.

Referring to FIG. 1, because the pickup function of the picker 210*a* at the top right is blocked, the controller 220 may not assign a second number to the picker 210*a* at the top right, sequentially assign 0, 1, 2, . . . , and 6 from the picker 210 next to the picker 210*a* at the top right to the left, sequentially assign 7, 8, . . . , and 11 to the pickers 210 on the next, e.g., second, row from the right to the left, not assign a second number to the picker 210*a* having a blocked pickup function and positioned on the second row, and sequentially assign 12 and 13 to the pickers 210 to the left of the picker 210*a* on the second row.

The controller 220 may generate the plurality of combinations by matching the second numbers assigned to the pickers 210 to each of the first numbers assigned to the remaining semiconductor packages 10*a*. For example, the plurality of combinations may be formed by randomly matching the second numbers, e.g., 0, 1, 2, . . . , and 13, to each of the first numbers, e.g., 0, 1, 2, . . . , and 13.

FIG. 12 is a table representing a first set consisting of a plurality of combinations generated by matching second numbers assigned to pickers to first numbers assigned to remaining semiconductor packages according to some example embodiments.

Referring to FIG. 12, the first combination may be formed by respectively matching 6, 9, 5, 8, 12, . . . , and 2 to the first numbers assigned to the remaining semiconductor packages, and the second combination may be formed by respectively matching 0, 2, 6, 13, 11, . . . , and 1 to the first numbers assigned to the remaining semiconductor packages.

The first combination formed by matching one of the second numbers assigned to the pickers 210 to one of the first numbers assigned to the remaining semiconductor packages 10*a* indicates a picker 210 by which a remaining semiconductor package 10*a* is picked up. For example, in the first combination, matching a second number 6 to a first number 0 means that the remaining semiconductor package 10*a* corresponding to the first number 0 is picked up by the picker 210 corresponding to the second number 6.

In some example embodiments, if the number of first combinations reaches a certain number, e.g., 1000, and if the second time is greater than a time by which the picker tool 200 places semiconductor packages on the test socket unit 300 and then moves to a pickup position, or if there is a stop request for a time calculation process according to the second method, the controller 220 may end the time calculation process according to the second method.

The controller 220 may calculate a first suitability for each of the plurality of combinations belonging to the first set.

The first suitability may be the inverse value of the total time taken for the picker tool 200 to move to the first tray 110, pick up the remaining semiconductor packages 10*a*, move to the test socket unit 300, and place the picked remaining semiconductor packages 10*a* on the test socket unit 300.

A pick and place time T may be represented by Equation (1) below.

$$T = S_c \times (M_1 + S_t + M_2) + \sum_{i=1}^{n} (P_{t_i}) \quad (1)$$

where $S_c$ denotes the number of place times, $S_t$ denotes a place time, $P_t$ denotes a pickup time, $M_1$ denotes a moving time to a test socket unit 300, and $M_2$ denotes a moving time to a first tray 110.

In some example embodiments, because the first suitability is the inverse value of the pick and place time T, the first suitability may increase as the pick and place time T decreases. Therefore, the first suitability of an nth combination having the shortest pick and place time T is the greatest.

The controller 220 may generate a second set consisting of at least one new combination by modifying the plurality of combinations belonging to the first set and calculate a second suitability for each of the at least one new combination belonging to the second set.

The controller 220 may generate the second set by using a genetic algorithm to generate new combinations from combinations belonging to the first set. The controller 220 may generate the second set from the first set by using, for example, selection, crossover, and mutation operators of the genetic algorithm. The second set may include a second-1 set and a second-2 set. The second-1 set may include combinations generated by selection and crossover, and the second-2 set may include combinations generated by mutating the combinations belonging to the second-1 set.

A process of generating the second-1 set and the second-2 set by using the selection, crossover, and mutation operators, according to some example embodiments, is as follows.

The controller 220 may calculate the selection probability of each of the plurality of combinations belonging to the first set, select two combinations in a higher selection probability order from among the plurality of combinations belonging to the first set, and generate the second-1 set including combinations generated by exchanging second numbers between the selected two combinations. According to some example embodiments, the selection probability is the value obtained by dividing the suitability of each combination by the sum of the suitabilities of all the combinations belonging to the same set. For example, it may be considered that the selection probability is a share ratio of each combination belonging to the first set in terms of suitability. For example, it may be considered that a combination having a high suitability has a high share ratio in the first set in terms of suitability, and if a combination is selected according to the suitability, the selection probability of a combination having a high suitability may be high and the selection probability of a combination having a low suitability may be low.

Figure 13B:
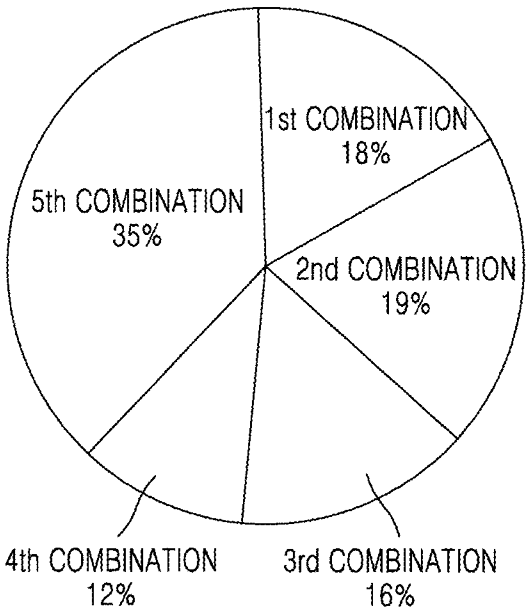
FIG. 13B is a circular chart showing the selection probabilities of FIG. 13A according to some example embodiments.

FIG. 13A is a table representing the pick and place times and selection probabilities of combinations belonging to the first set according to some example embodiments, and FIG. 13B is a circular chart showing the selection probabilities of FIG. 13A according to some example embodiments.

Referring to FIG. 13A, the table shows the pick and place times and selection probabilities of first to fifth combinations. The fifth combination has a pick and place time of five (5) seconds that is the shortest. The fourth combination has a pick and place time of 15 seconds that is the longest. For example, because the selection probability is the value obtained by dividing the suitability of each combination by the sum of the suitabilities of all combinations and the suitability is the inverse value of the pick and place time, the selection probability of the fifth combination having the shortest pick and place time is 35.5% that is the greatest and the selection probability of the fourth combination having the longest pick and place time is 11.9% that is the smallest.

FIG. 13B is a circular chart showing the selection probability of each combination according to some example embodiments. In the circular chart, the area occupied by a combination in the circular chart may be determined according to the selection probability of the combination. The fifth combination having the greatest selection probability occupies the greatest area in the circular chart, and the second, first, third, and fourth combinations may occupy a next larger area in their order in the circular chart.

The controller 220 may select two combinations in a higher selection probability order from among the combinations belonging to the first set and generate the second-1 set including combinations newly generated by exchanging second numbers between the selected two combinations.

Table 1 represents the selected two combinations and combinations generated through crossover between the selected two combinations.

TABLE 1

| First number | | 0 | 1 | 2 | 3 | 4 | 5 |
|---|---|---|---|---|---|---|---|
| Fifth combination | Second number | 11 | 9 | 5 | 6 | 12 | 8 |
| Second combination | Second number | 0 | 7 | 3 | 4 | 10 | 13 |
| Fifth-1 combination | Second number | 11 | 9 | 3 | 4 | 10 | 8 |
| Second-1 combination | Second number | 0 | 7 | 5 | 6 | 12 | 13 |

Referring to Table 1, the fifth combination and the second combination are selected in the higher selection probability order from among the combinations belonging to the first set. The fifth combination may have 11, 9, 5, 6, 12, and 8 as second numbers matched to first numbers, and the second combination may have 0, 7, 3, 4, 10, and 13 as second numbers matched to the first numbers.

The controller 220 may generate new fifth-1 and second-1 combinations by exchanging second numbers matched to the same first numbers between the fifth and second combinations.

For example, the controller 220 may generate the fifth-1 combination and the second-1 combination by respectively exchanging 5, 6, and 12 among the second numbers of the fifth combination matched to 2, 3, and 4 among the first numbers with 3, 4, and 10 among the second numbers of the second combination matched to 2, 3, and 4 among the first numbers. The fifth combination may sequentially have 11, 9, 5, 6, 12, and 8 as the second numbers matched to the first numbers, the second combination may sequentially have 0, 7, 3, 4, 10, and 13 as the second numbers matched to the first numbers, the newly generated fifth-1 combination may sequentially have 11, 9, 3, 4, 10, and 8 as the second numbers matched to the first numbers, and the newly generated second-1 combination may sequentially have 0, 7, 5, 6, 12, and 13 as the second numbers matched to the first numbers.

In some example embodiments, the controller 220 may also select two combinations in a suitability order from among the other combinations belonging to the first set, generate new combinations by exchanging second numbers between the selected two combinations, and generate the second-1 set including the new combinations.

Although Table 1 illustrates second numbers matched to 2, 3, and 4 among the first numbers as a section exchanged between selected two combinations, example embodiments are not limited thereto, and, in some example embodiments, the section to be exchanged between the selected two combinations may be randomly selected.

The controller 220 may generate the second-2 set including other combinations by exchanging second numbers in the newly generated combinations. The second-1 set differs from the second-2 set in that the second-1 set includes combinations generated by exchanging second numbers between two combinations selected from the first set, whereas the second-2 set includes combinations each generated by exchanging second numbers matched to first numbers within one combination belonging to the second-1 set. For example, it may be considered that the second-1 set is generated by the crossover operator and the second-2 set is generated by the mutation operator.

Table 2 illustrates fifth-2 combination generated by exchanging second numbers in the fifth-1 combination of Table 1 and second-2 combination generated by exchanging second numbers in the second-1 combination of Table 1 according to some example embodiments.

TABLE 2

| First number | | 0 | 1 | 2 | 3 | 4 | 5 |
|---|---|---|---|---|---|---|---|
| Fifth-1 combination | Second number | 11 | 9 | 3 | 4 | 10 | 8 |
| Second-1 combination | Second number | 0 | 7 | 5 | 6 | 12 | 13 |
| Fifth-2 combination | Second number | 11 | 8 | 3 | 4 | 10 | 9 |
| Second-2 combination | Second number | 0 | 13 | 5 | 6 | 12 | 7 |

Referring to Table 2, in some example embodiments, the fifth-1 combination and the second-1 combination are generated through crossover of the fifth combination and the second combination belonging to the first set as described above. The controller 220 may generate the fifth-2 combination by exchanging second numbers in the fifth-1 combination and generate the second-2 combination by exchanging second numbers in the second-1 combination.

For example, the controller 220 may generate the fifth-2 combination by exchanging 9 and 8 among the second numbers respectively matched to 1 and 5 among the first numbers of the fifth-1 combination. The fifth-1 combination sequentially has 11, 9, 3, 4, 10, and 8 as the second numbers matched to the first numbers, but the fifth-2 combination may sequentially have 11, 8, 3, 4, 10, and 9 as the second numbers matched to the first numbers.

In some example embodiments, the controller 220 may generate the second-2 combination by exchanging 7 and 13 among the second numbers respectively matched to 1 and 5 among the first numbers of the second-1 combination. The second-1 combination sequentially has 0, 7, 5, 6, 12, and 13 as the second numbers matched to the first numbers, but the second-2 combination may sequentially have 0, 13, 5, 6, 12, and 7 as the second numbers matched to the first numbers.

The controller 220 may calculate the pick and place time T described above for each of the combinations belonging to the second set (e.g., the second-1 set and the second-2 set) generated from the first set and calculate a second suitability by obtaining the inverse value of the pick and place time T.

The controller 220 may compare the first suitabilities of the combinations belonging to the first set to the second suitabilities of the combinations belonging to the second set and select a combination having the highest suitability. Because a suitability is the inverse value of a pick and place time, a combination having the highest suitability means a combination having the shortest pick and place time.

According to some example embodiments, as described above, before picking up the remaining semiconductor packages 10*a* in the first tray 110, pick and place times may be calculated by virtual simulation according to the first method for a search using the maximum number of remaining semiconductor packages 10*a* picked up as priority and the second method using the genetic algorithm, and the remaining semiconductor packages 10*a* may be picked up and placed according to a method taking the shortest time, thereby reducing a process time.

Figure 2:
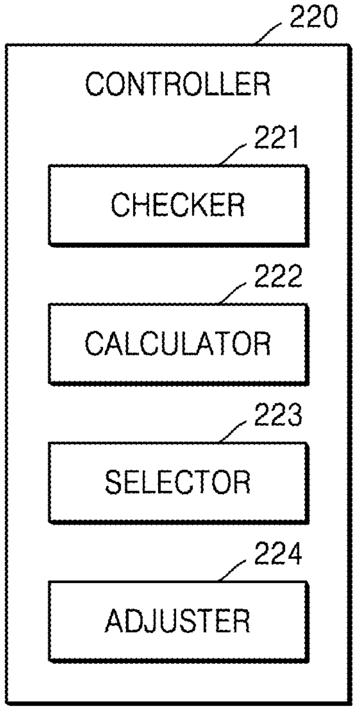
FIG. 2 is a block diagram illustrating a controller of FIG. 1 according to some example embodiments.

FIG. 2 is a block diagram illustrating the controller 220 of FIG. 1 according to some example embodiments.

Referring to FIG. 2, the controller 220 may include, for example, a checker 221, a calculator 222, a selector 223, and an adjuster 224. In some example embodiments, the controller 220 and each of the checker 221, calculator 222, selector 223, and adjuster 224 may include or be implemented in one or more processing circuitries such as hardware including logic circuits; a hardware/software combination such as a processor executing software; or a combination thereof. For example, the processing circuitries more specifically may include, but are not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The checker 221 may check whether there are remaining semiconductor packages 10*a* remaining in the first tray 110 without being transferred (e.g., that have not been transferred). According to some example embodiments, before pick-and-place is performed by the picker tool 200, the checker 221 may check whether the plurality of test sockets 310 of the test socket unit 300 are normal and block the pickup function of the pickers 210*a* of the picker tool 200 corresponding to the abnormal test sockets 310*a*. While blocking the pickup function of the pickers 210*a*, the picker tool 200 may pick up semiconductor packages from the first tray 110 and place the picked semiconductor packages on the test socket unit 300. Thereafter, the checker 221 may check whether there are remaining semiconductor packages 10*a* in the first tray 110.

After the checker 221 checks that there are the remaining semiconductor packages 10*a* in the first tray 110, the calculator 222 may simulate and calculate, according to the first method and the second method, a time by which the picker tool 200 picks up the remaining semiconductor packages 10*a*, compare a first time calculated according to the first method to a second time calculated according to the second method, select a method taking the shortest time between the first time and the second time, and control the picker tool 200 to pick up the remaining semiconductor packages 10*a* according to the selected method.

According to some example embodiments, because a test on the remaining semiconductor packages 10*a* may not be performed due to the abnormal test sockets 310*a*, it may be preferable that the test on the remaining semiconductor packages 10*a* be performed by normal test sockets 310. According to some example embodiments, because the remaining semiconductor packages 10*a* may remain in the first tray 110 to be spaced apart from each other, there may be various methods by which the picker tool 200 picks up the remaining semiconductor packages 10*a*, and a pick and place time may vary according to the various methods.

The calculator 222 may calculate times by which the picker tool 200 picks and places the remaining semiconductor packages 10*a* according to the first method and the second method before picking and placing the remaining semiconductor packages 10*a*. As described above, according to some example embodiments, the first method is a selection method using the maximum number of remaining semiconductor packages picked up as priority, and the second method is a method using the genetic algorithm.

The calculator 222 may calculate the first time according to the first method according to some example embodiments described below.

The calculator 222 may compare the number of remaining semiconductor packages 10*a* which the picker tool 200 is able to pick up at a certain position to the maximum number of remaining semiconductor packages 10*a* which the picker tool 200 is able to pick up.

The picker tool 200 may move by a certain distance above the first tray 110 and then pick up remaining semiconductor packages 10*a*. Remaining semiconductor packages 10*a* existing in a region of the first tray 110 overlapping the orthogonal projection region of the picker tool 200 while the picker tool 200 moves above the first tray 110 may correspond to remaining semiconductor packages 10*a* which the picker tool 200 is able to pick up at a certain position.

The calculator 222 may check the number of remaining semiconductor packages 10*a* which the picker tool 200 is able to pick up while virtually moving the picker tool 200 by one accommodation space of the first tray 110 in the first direction D1.

In some example embodiments, the calculator 222 may set the number of pickers 210*a* having a blocked pickup function as the maximum number of remaining semiconductor packages 10*a* which the picker tool 200 is able to pick up.

In some example embodiments, if the maximum number of remaining semiconductor packages 10*a* which the picker tool 200 is able to pick up is greater than the number of remaining semiconductor packages 10*a* which the picker tool 200 is able to pick up at a certain position, the calculator 222 may move the picker tool 200 in the first direction D1 or the second direction D2. Because picking up at once the maximum number of remaining semiconductor packages 10*a* which the picker tool 200 is able to pick up may reduce a pick and place time rather than picking up one remaining semiconductor package 10*a* at once, the calculator 222 may move the picker tool 200 in the first direction D1 or the second direction D2 to find out a position where the maximum number of remaining semiconductor packages 10*a* which the picker tool 200 is able to pick up may be picked up at once.

In some example embodiments, if the maximum number of remaining semiconductor packages 10*a* which the picker tool 200 is able to pick up is the same as the number of remaining semiconductor packages 10*a* which the picker tool 200 is able to pick up at a current position, the calculator 222 may control the picker tool 200 to virtually pick up the remaining semiconductor packages 10*a*.

According to some example embodiments, when the calculator 222 moves the picker tool 200 in the first direction D1, if a moved distance of the picker tool 200 in the first direction D1 is less than the length of the first tray 110 in the first direction D1, the calculator 222 may relatively move the picker tool 200 in the first direction D1 with respect to the first tray 110. Otherwise, if the moved distance of the picker tool 200 in the first direction D1 is greater than or equal to the length of the first tray 110 in the first direction D1, the calculator 222 may relatively move the picker tool 200 in the second direction D2 that is perpendicular to the first direction D1 with respect to the first tray 110.

Accordingly, in some example embodiments, by controlling the movement of the picker tool 200 as described above, the calculator 222 may obtain the shortest-moving path of the picker tool 200 to obtain the shortest pick and place time for the remaining semiconductor packages 10*a*.

The calculator 222 may calculate a time to be taken until the pickers 210 of the picker tool 200 cannot pick up any more remaining semiconductor package 10*a* because all the pickers 210 have picked up the remaining semiconductor packages 10*a* or there is no remaining semiconductor package 10*a* in the first tray 110. This calculated time may be the first time according to the first method.

The differences between remaining semiconductor package pickup according to conventional art and remaining semiconductor package pickup in the first direction D1 and the second direction D2 according to some example embodiments are described with reference to FIGS. 3 to 6I.

Figure 3:
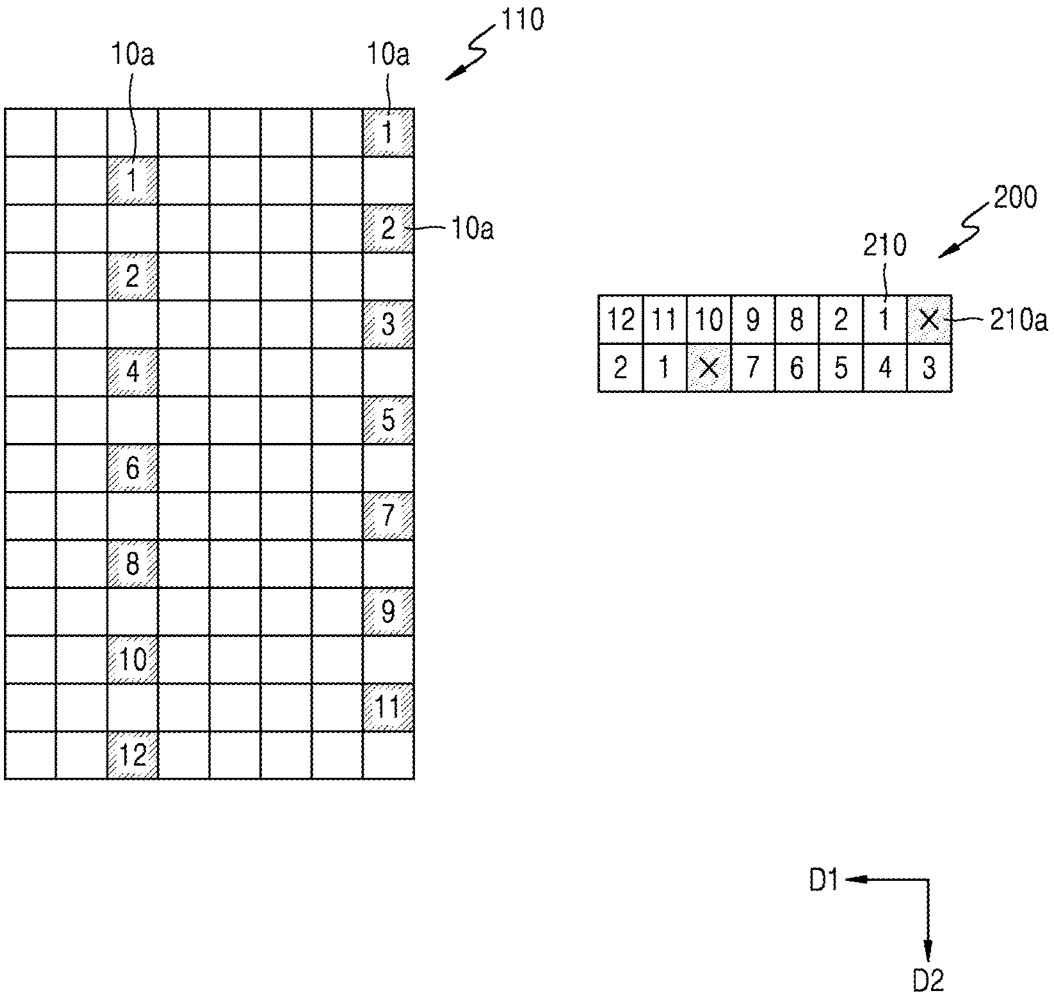
FIG. 3 is a conceptual diagram illustrating that an order of picking up remaining semiconductor packages is matched to a picker tool, according to conventional art.

FIG. 3 is a conceptual diagram illustrating that an order of picking up remaining semiconductor packages 10*a* is matched to the picker tool 200, according to conventional art.

Referring to FIG. 3, the number of remaining semiconductor packages 10*a* in the first tray 110 is 14 and the numbers marked on the remaining semiconductor packages 10*a* indicate a pickup order of the picker tool 200. That is, 1 marked on remaining semiconductor packages 10*a* indicates first pickup by the picker tool 200, 2 indicates second pickup, and 3 indicates third pickup. Remaining semiconductor packages 10*a* to which the same number is assigned are simultaneously picked up by the picker tool 200 in the order of the number. For example, two remaining semiconductor packages 10*a* marked with 1 are simultaneously picked up first. The number of remaining semiconductor packages 10*a* marked with 3 is 1, and the remaining semiconductor package 10*a* marked with 3 may be picked up third.

The picker tool 200 may pick up the remaining semiconductor packages 10*a* on the first tray 110 by using the pickers 210 remaining by excluding the pickers 210*a* having a blocked pickup function from the plurality of pickers 210 of the picker tool 200. The numbers marked on the pickers 210 of the picker tool 200 indicate the remaining semiconductor packages 10*a* to be picked up, respectively. The remaining semiconductor packages 10*a* marked with 1 in the first tray 110 may be picked up by the pickers 210 marked with 1. Remaining semiconductor packages 10*a* marked with the same number may be simultaneously picked up by pickers 210 marked with the number in the order indicated by the number. For example, the two remaining semiconductor packages 10*a* marked with 1 are simultaneously picked up by the pickers 210 marked with 1 first.

FIGS. 4A to 4L illustrate a conventional method of picking up the remaining semiconductor packages 10*a* of FIG. 3. As shown in FIGS. 4A to 4L, the existing method of picking up the remaining semiconductor packages 10*a* may sequentially pick up the remaining semiconductor packages 10*a* in the first tray 110 while moving the picker tool 200 in the first direction D1 and in the second direction D2 with respect to the first tray 110.

Figure 4A:
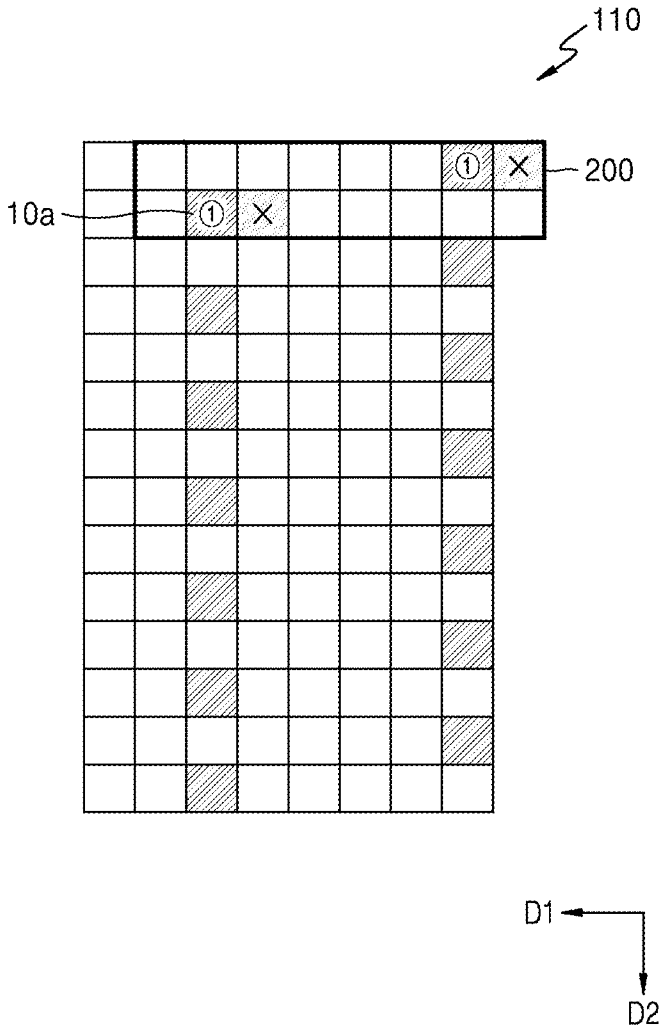
FIGS. 4A to 4L illustrate a conventional method of picking up the remaining semiconductor packages of FIG. 3.

For example, referring to FIG. 4A, the picker tool 200 may move to a position where the remaining semiconductor packages 10*a* on the first and second rows of the first tray 110 are simultaneously picked up and pick up the remaining semiconductor packages 10*a*.

Figure 4B:
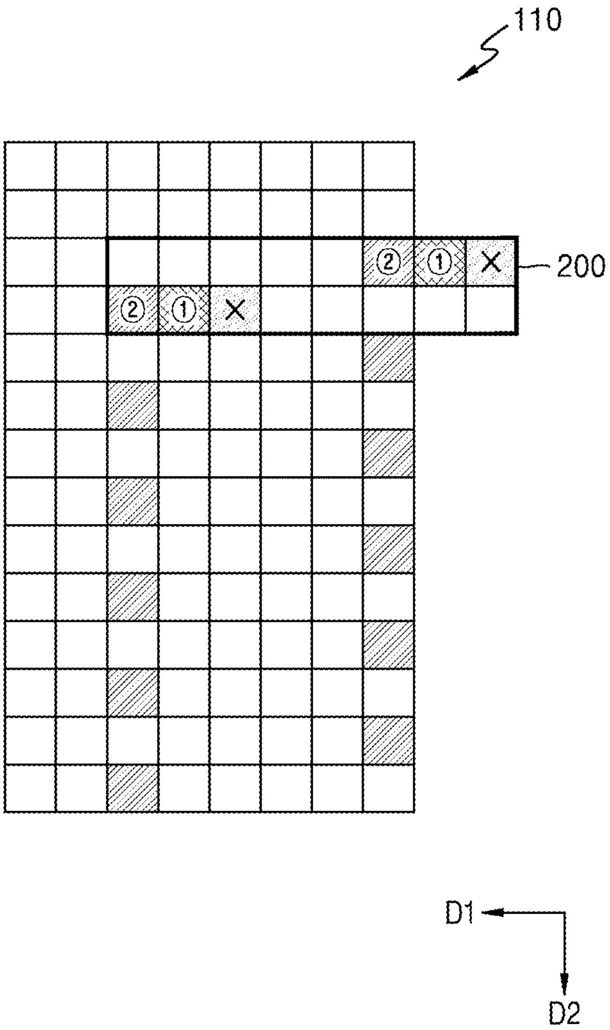

Next, referring to FIG. 4B, the picker tool 200 may move in the second direction D2 and in the opposite direction of the first direction D1 and simultaneously pick up the remaining semiconductor packages 10*a* on the third and fourth rows.

Figure 4C:
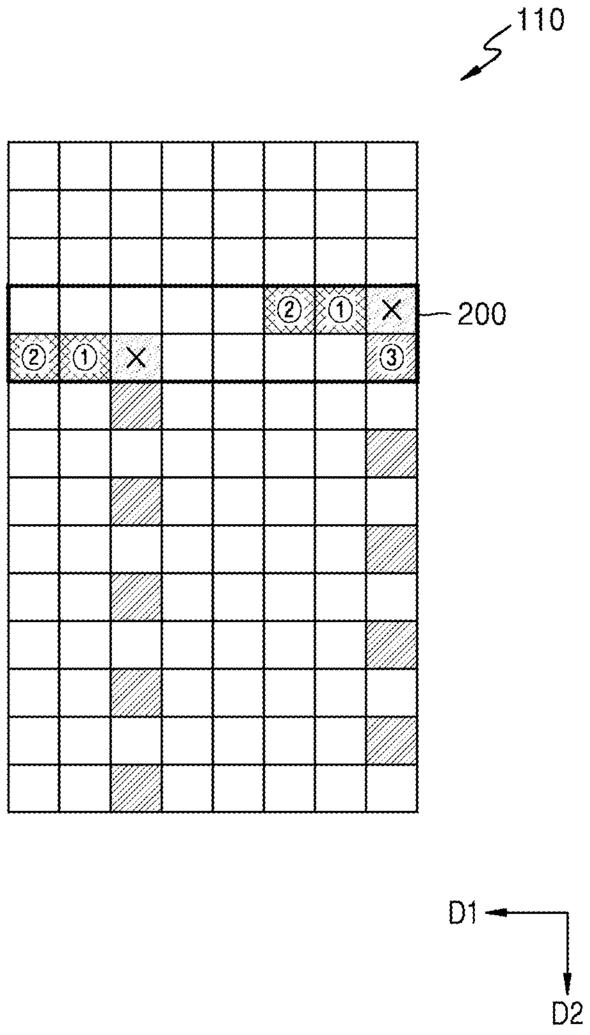
Figure 4D:
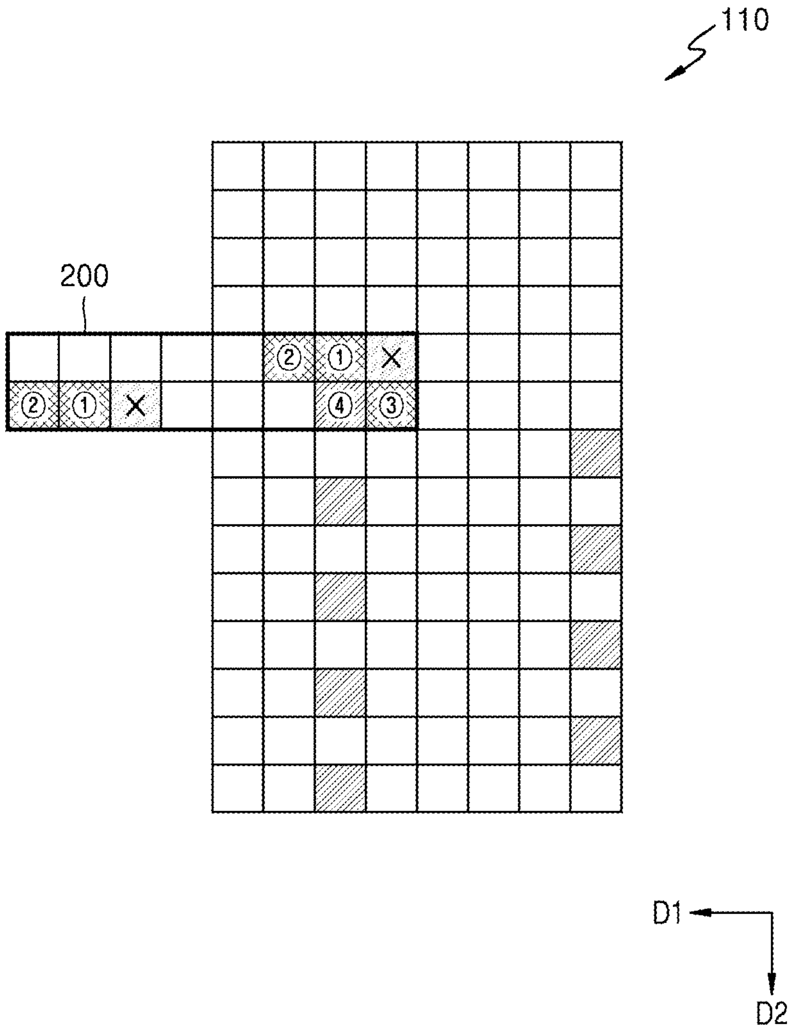
Figure 4E:
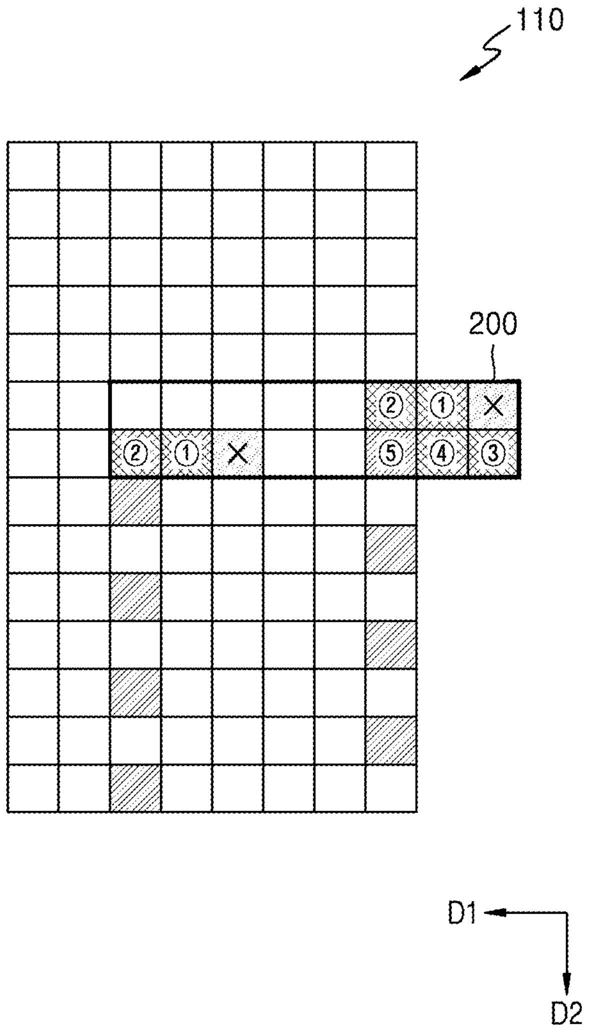
Figure 4F:
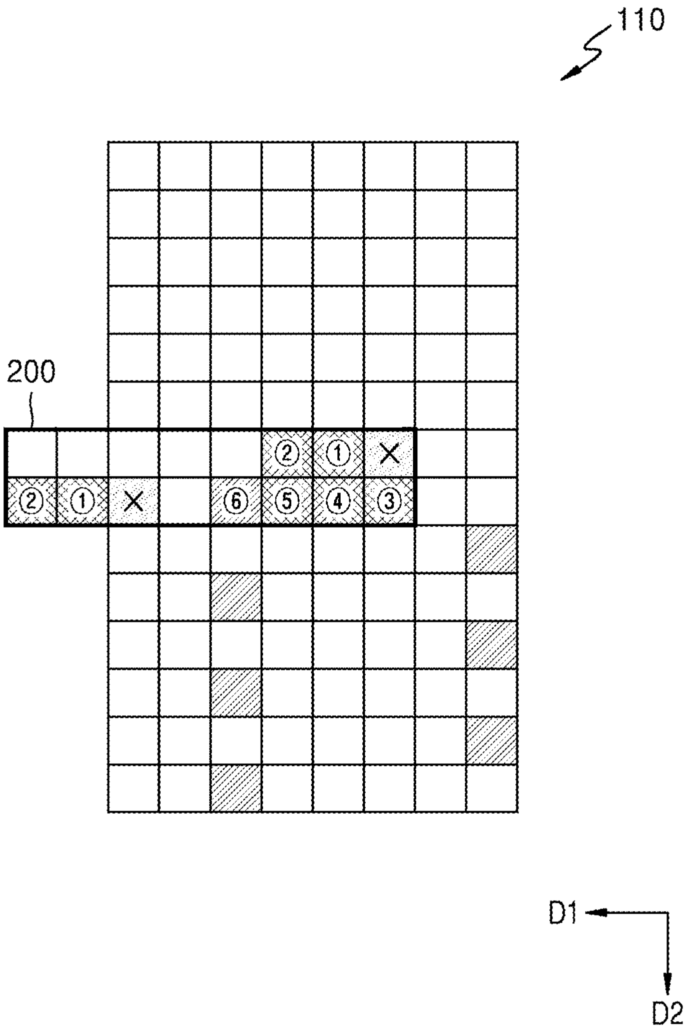
Figure 4G:
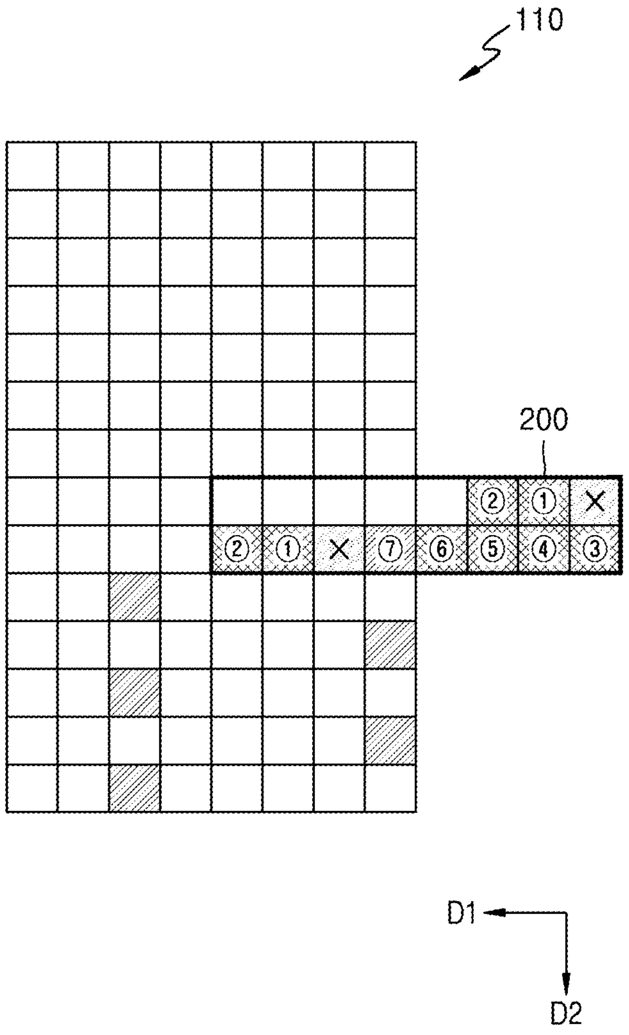
Figure 4H:
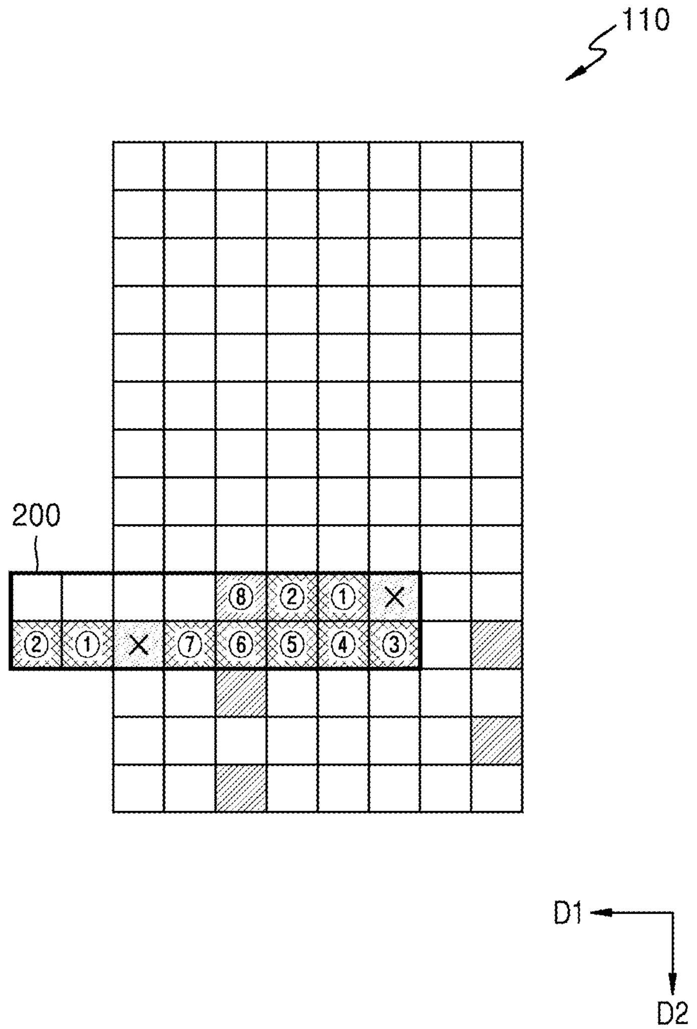
Figure 4I:
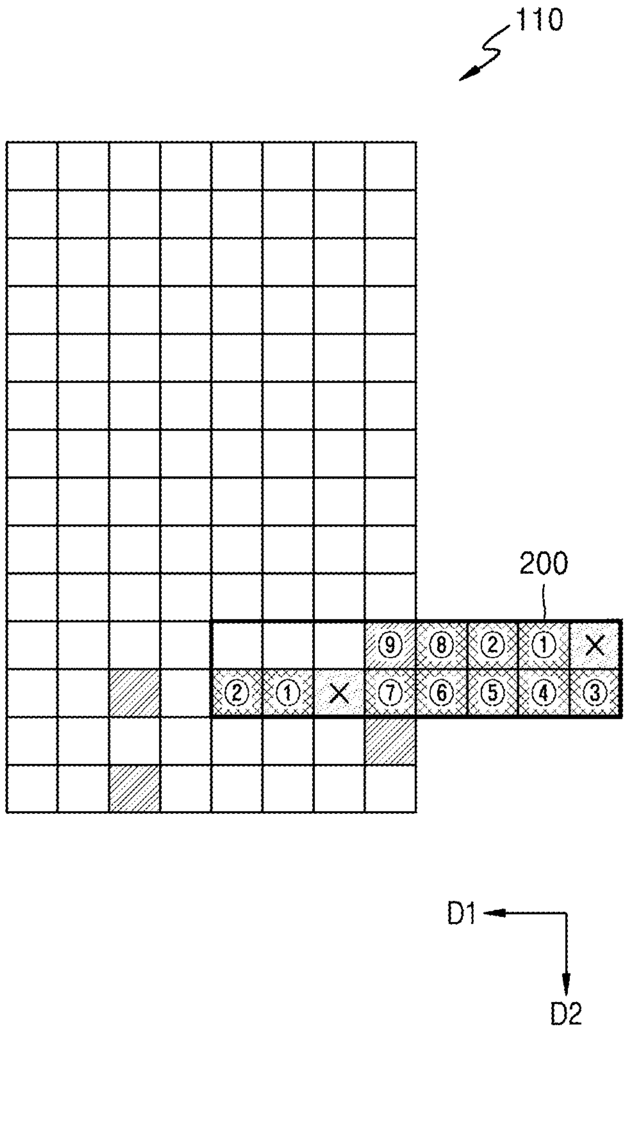
Figure 4J:
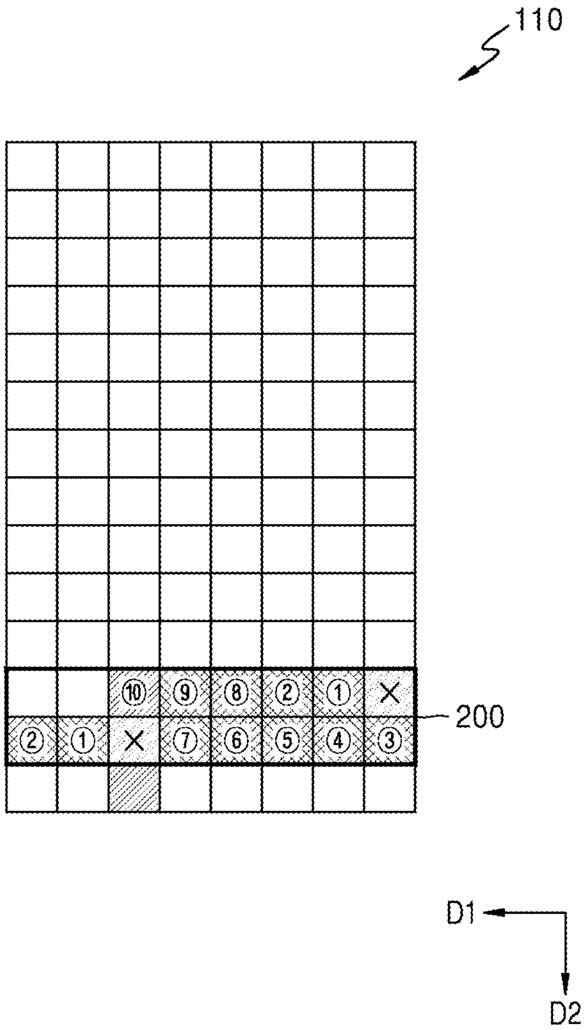
Figure 4K:
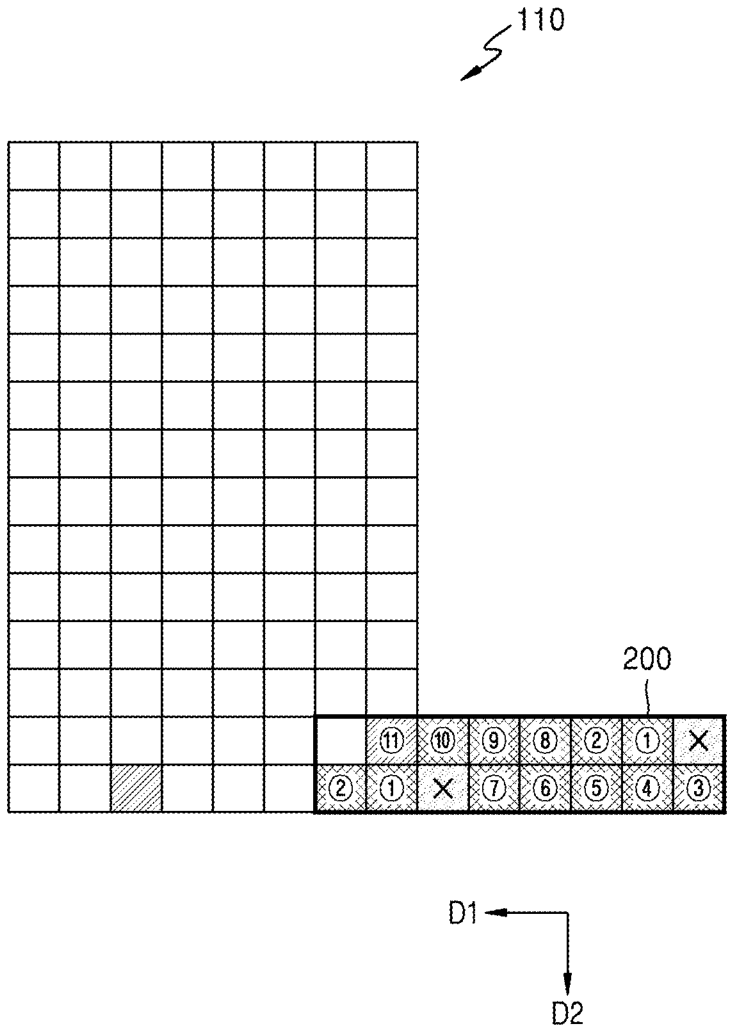
Figure 4L:
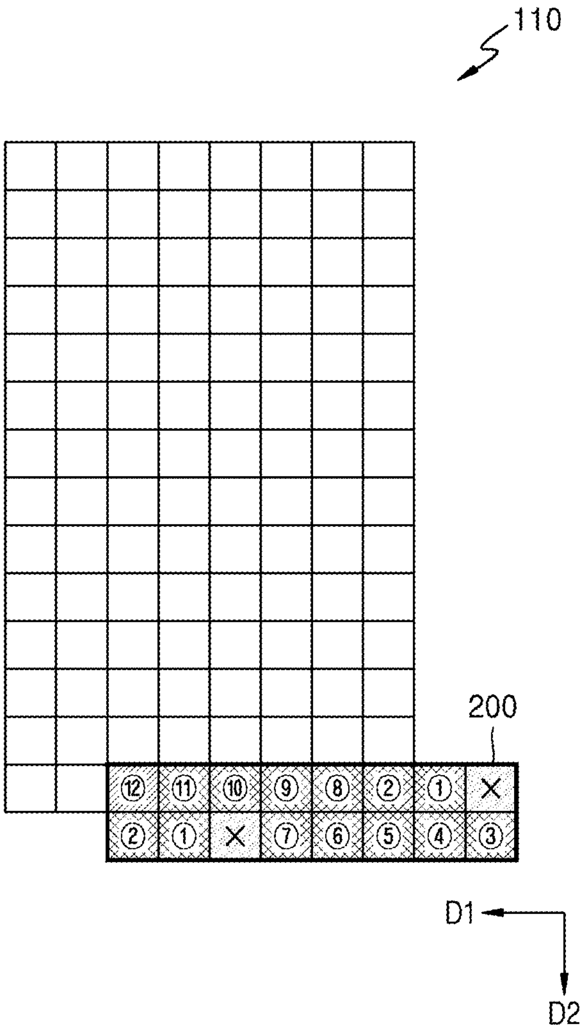

Next, referring to FIG. 4C, the picker tool 200 may move in the second direction D2 and in the first direction D1 and pick up the remaining semiconductor package 10*a* on the fifth row.

Thereafter, the picker tool 200 may sequentially move in the second direction D2 and pick up the other remaining semiconductor packages 10*a* one by one.

As described above, in the conventional method of sequentially picking up remaining semiconductor packages, as shown in FIG. 3, the 14 remaining semiconductor packages 10*a* on the first tray 110 may be picked up over a total of 12 times.

Figure 5:
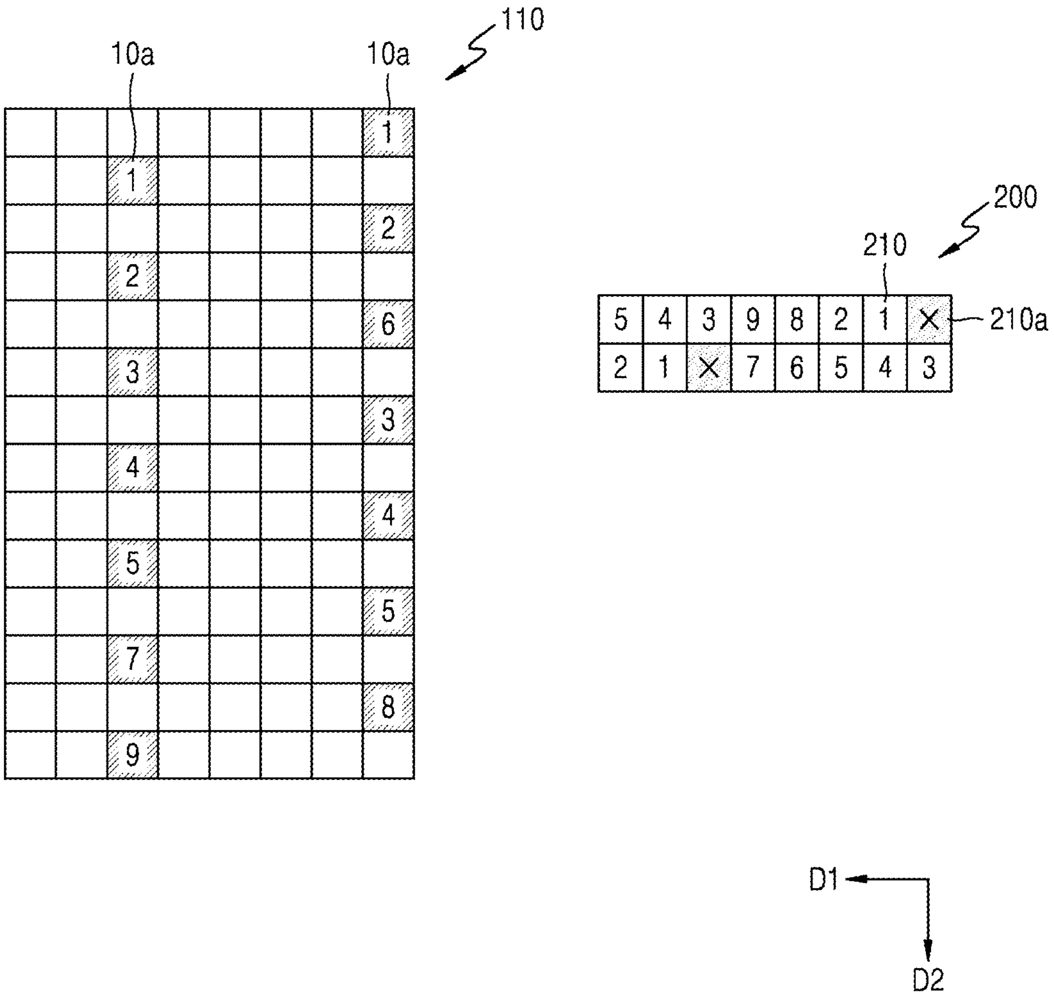
FIG. 5 is a conceptual diagram illustrating that an order of picking up remaining semiconductor packages is matched to a picker tool, according to a first method of some example embodiments.

FIG. 5 is a conceptual diagram illustrating that an order of picking up remaining semiconductor packages is matched to a picker tool, according to the first method, and FIGS. 6A to 6I illustrate a method of picking up remaining semiconductor packages according to the first method of FIG. 5.

Referring to FIGS. 5 and 6A to 6I, the number of remaining semiconductor packages 10*a* in the first tray 110 is 14 and the numbers marked on the remaining semiconductor packages 10*a* indicate a pickup order of the picker tool 200. In some example embodiments, 1 marked on remaining semiconductor packages 10*a* indicates first pickup by the picker tool 200, 2 indicates second pickup, and 3 indicates third pickup. Remaining semiconductor packages 10*a* to which the same number is assigned are simultaneously picked up by the picker tool 200 in the order of the number. For example, two remaining semiconductor packages 10*a* marked with 1 are simultaneously picked up first. The number of remaining semiconductor packages 10*a* marked with 3 is 1, and the remaining semiconductor package 10*a* marked with 3 may be picked up third.

Unlike the conventional method shown in FIG. 3, according to some example embodiments, the picker tool 200 may simultaneously pick up two remaining semiconductor packages 10*a* up to a fifth time and pick up the other remaining semiconductor packages 10*a* one by one.

Figure 6A:
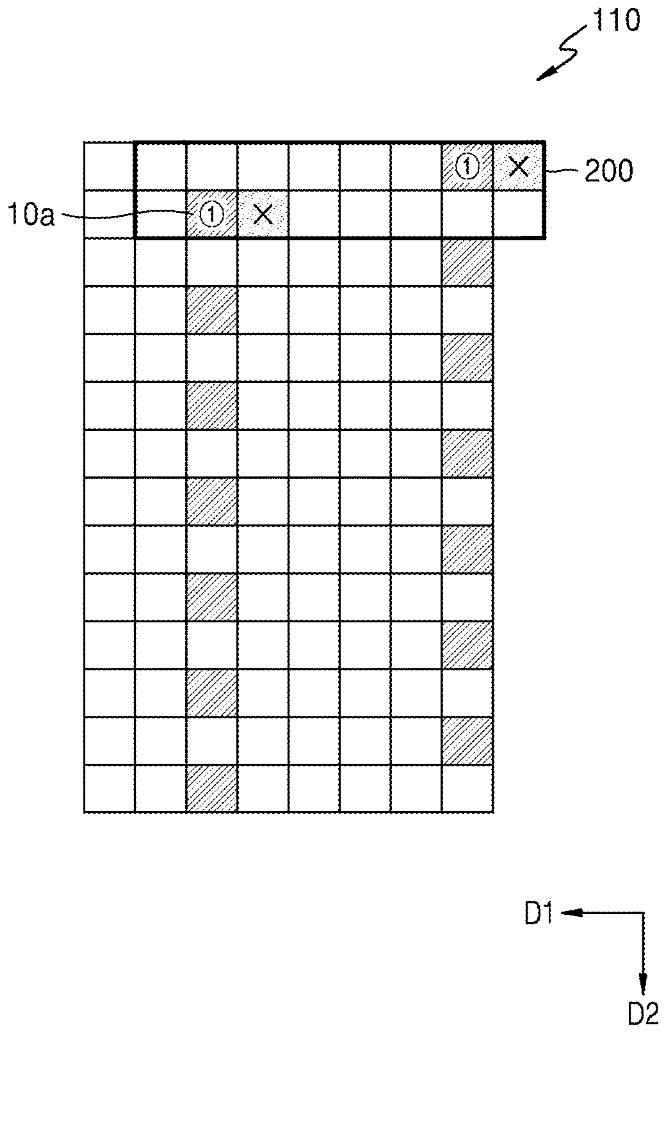
FIGS. 6A to 6I illustrate a method of picking up the remaining semiconductor packages according to the first method of FIG. 5 according to some example embodiments.
Figure 6B:
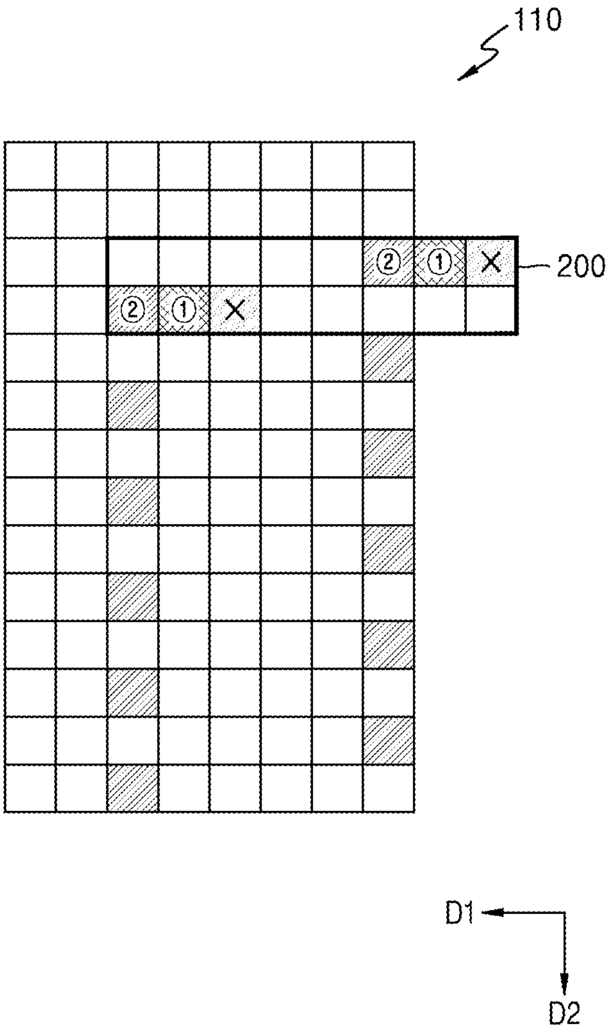

For example, like FIGS. 4A and 4B, referring to FIGS. 6A and 6B, the picker tool 200 may simultaneously pick up the remaining semiconductor packages 10*a* on the first and second row and simultaneously pick up the remaining semiconductor packages 10*a* on the third and fourth rows.

Figure 6C:
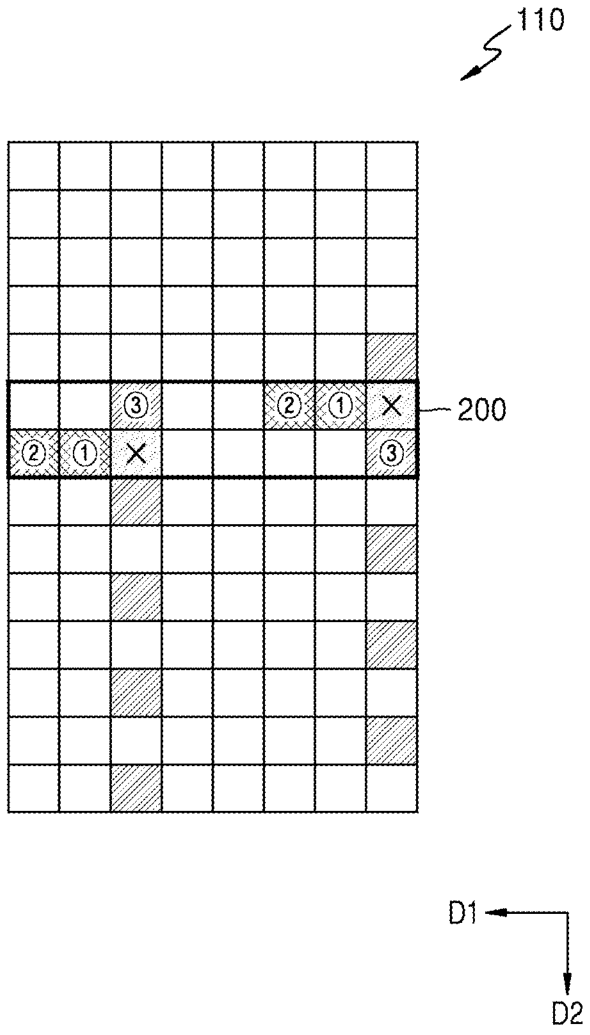

Next, referring to FIG. 6C, when the calculator 222 (see, e.g., FIG. 2) moves the picker tool 200 in the second direction D2 and in the first direction D1 to reach a position where the picker tool 200 is able to pick up the remaining semiconductor package 10*a* on the fifth row, the number of remaining semiconductor packages 10*a* which the picker tool 200 is able to pick up on the fifth row is 1 and is less than 2 that is the maximum number of remaining semiconductor packages 10*a* which the picker tool 200 is able to pick up, and thus, the calculator 222 (see, e.g., FIG. 2) may move the picker tool 200 to the next row without picking up the remaining semiconductor package 10*a* on the fifth row.

For example, because the picker tool 200 moved to the sixth row and is able to pick up two remaining semiconductor packages 10*a*, the calculator 222 (see, e.g., FIG. 2) may simultaneously pick up the two remaining semiconductor packages 10*a* respectively on the sixth and seventh rows.

Figure 6D:
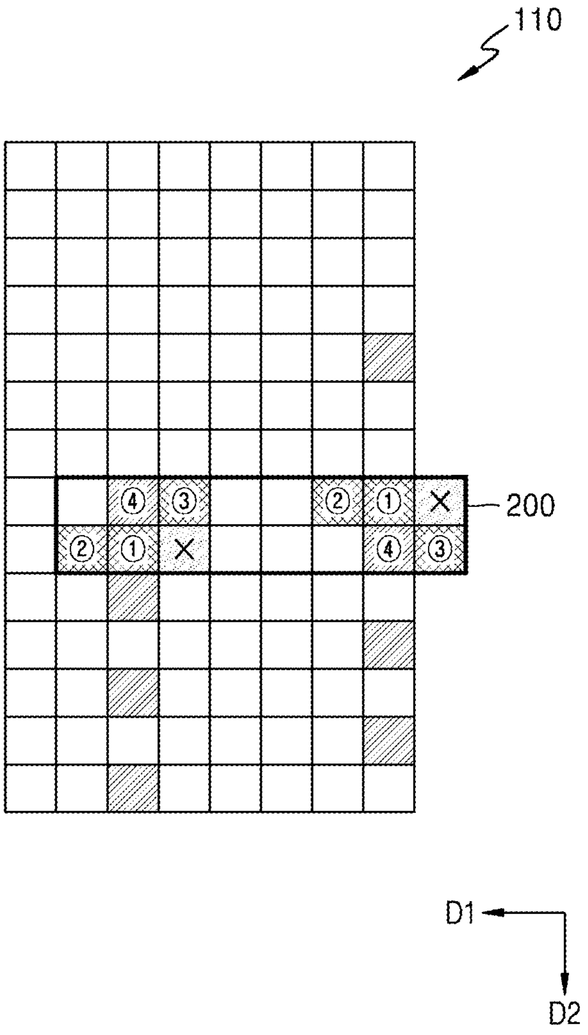
Figure 6E:
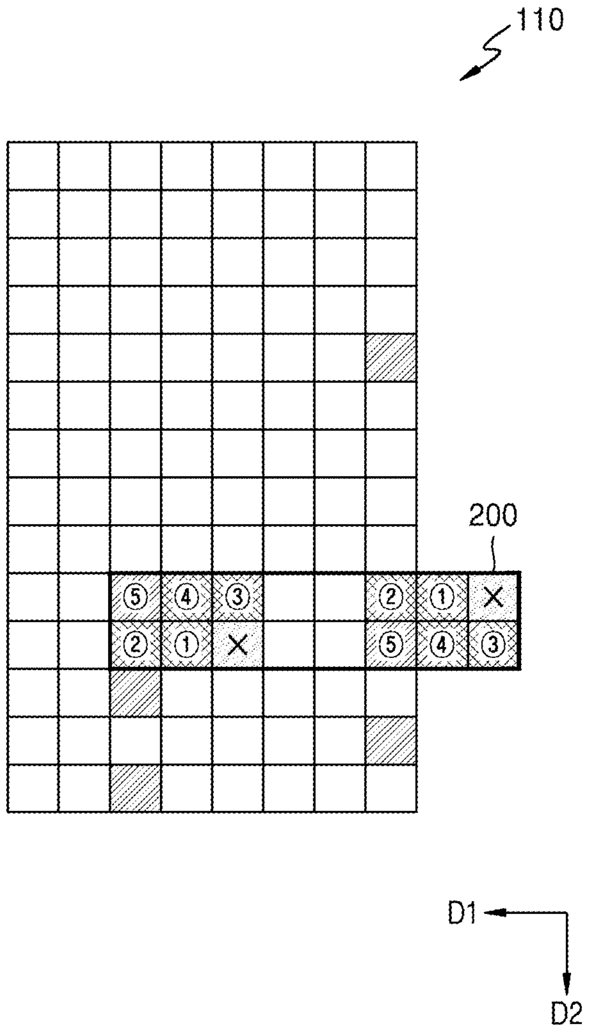
Figure 6F:
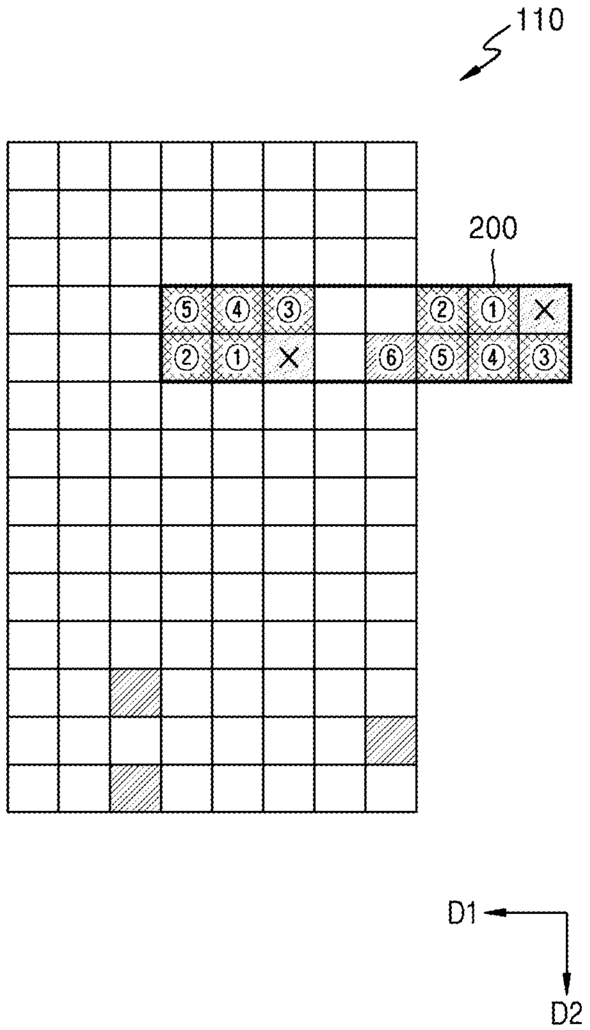
Figure 6G:
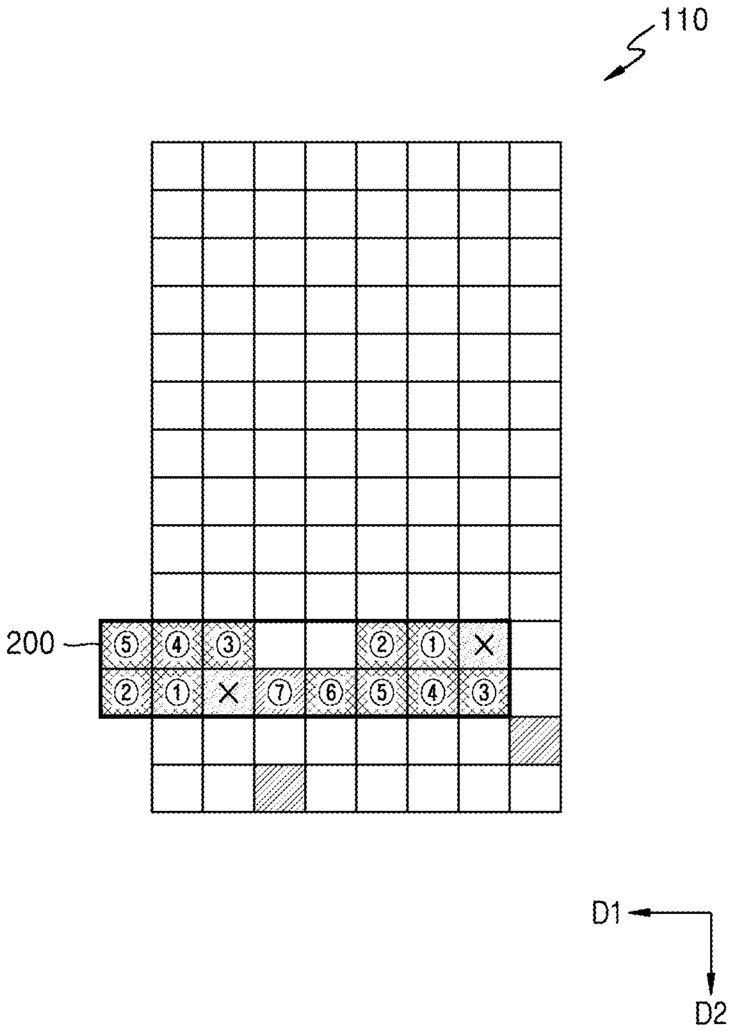
Figure 6H:
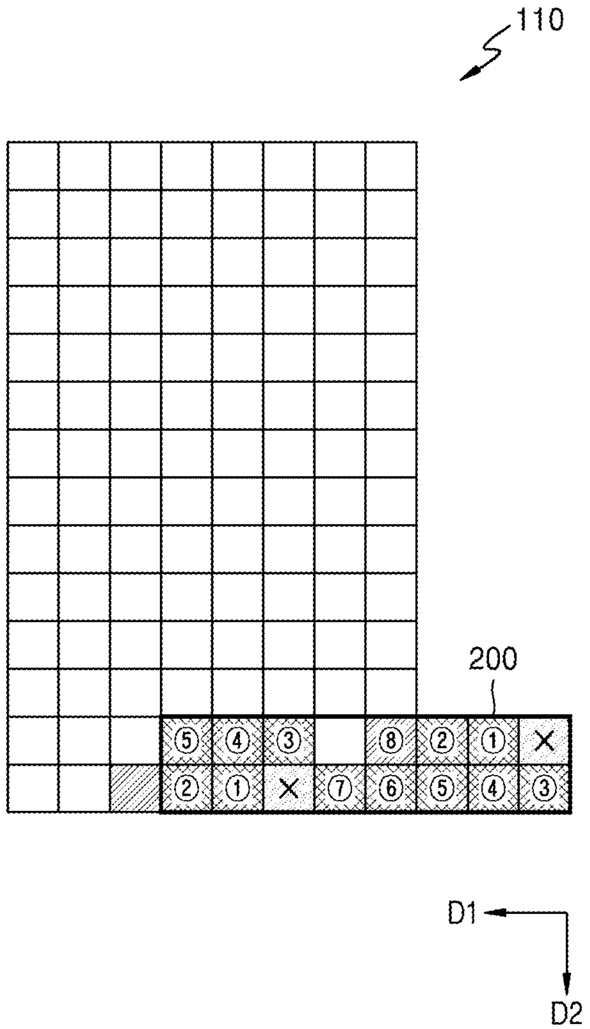
Figure 6I:
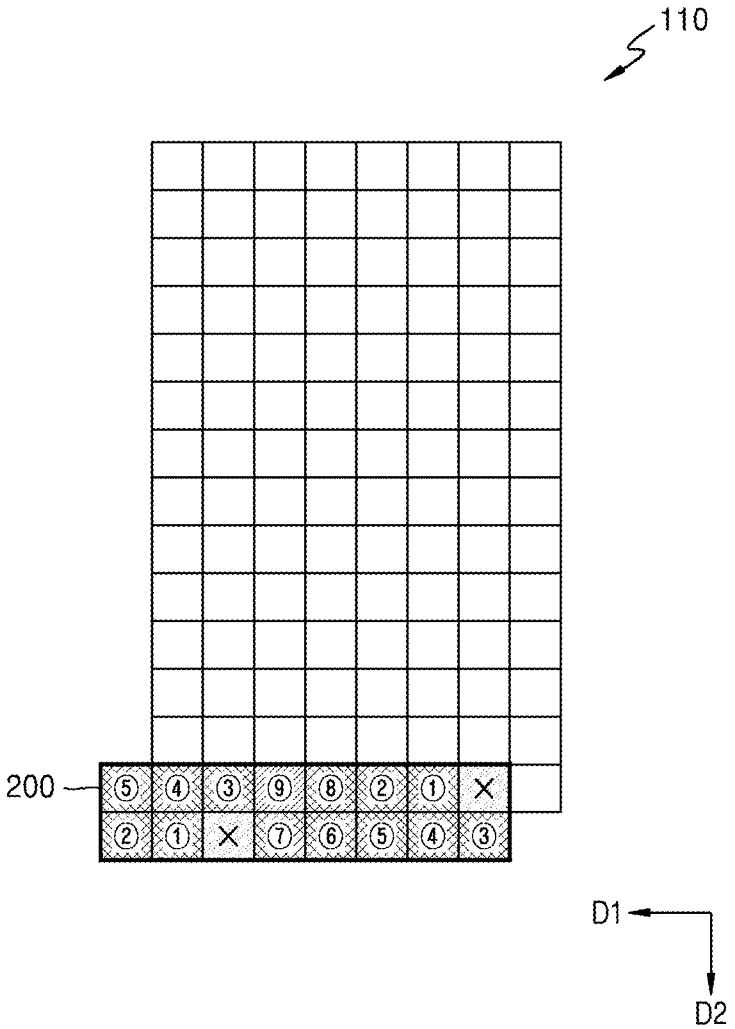

Next, as shown in FIG. 6D, the calculator 222 (see FIG. 2) may move the picker tool 200 to the eighth row and control the picker tool 200 to simultaneously pick up two remaining semiconductor packages 10*a*, and as shown in FIG. 6E, the calculator 222 (see, e.g., FIG. 2) may move the picker tool 200 to the tenth row and control the picker tool 200 to simultaneously pick up two remaining semiconductor packages 10*a*.

Thereafter, as shown in FIGS. 6F to 6I, the calculator 222 (see FIG. 2) may move the picker tool 200 in the second direction D2 or the first direction D1 and control the picker tool 200 to pick up the other remaining semiconductor packages 10*a* one by one.

As described above, according to some example embodiments, such as shown in FIGS. 5 and 6A to 6I, the 14 remaining semiconductor packages 10*a* on the first tray 110 may be picked up over a total of nine times. Compared to the conventional method, shown in FIGS. 3 and 4A to 4L, of picking up the remaining semiconductor packages 10*a* over a total of 12 times. Thus, according to some example embodiments, the pick and place time for the remaining semiconductor packages 10*a* in the first direction D1 and the second direction D2 may be reduced.

According to some example embodiments, the calculator 222 may calculate the second time according to the second method described below.

The calculator 222 may respectively assign first numbers to the remaining semiconductor packages 10*a*, respectively assign second numbers to the pickers 210 of the picker tool 200, and generate the first set consisting of a plurality of combinations obtained by matching the second numbers to each of the first numbers.

The calculator 222 may sequentially assign the first numbers to the remaining semiconductor packages 10*a* in the first tray 110 from the right to the left and from the top to the bottom.

For example, referring to FIG. 1, the calculator 222 may assign 0 to the remaining semiconductor package 10*a* at the top right of the first tray 110, assign 1 to the remaining semiconductor package 10*a* on the next row in the second direction D2, assign 2 to the remaining semiconductor package 10*a* on the next row in the second direction D2, and finally assign 13 to the remaining semiconductor package 10*a* on the last row in the second direction D2.

The calculator 222 may sequentially assign the second numbers to the pickers 210 of the picker tool 200 from the right to the left and from the top to the bottom. When the second numbers are assigned to the pickers 210 of the picker tool 200, the second numbers may not be assigned to the pickers 210*a* having a blocked pickup function.

The calculator 222 may generate a plurality of combinations by matching the second numbers assigned to the pickers 210 to each of the first numbers assigned to the remaining semiconductor packages 10*a*. In some example embodiments, the plurality of combinations may be formed by randomly matching the second numbers, e.g., 0, 1, 2, . . . , and 13, to each of the first numbers, e.g., 0, 1, 2, . . . , and 13.

FIG. 12 is a table representing a plurality of combinations generated by matching second numbers assigned to pickers to the first numbers assigned to remaining semiconductor packages and is as described above according to some example embodiments.

In some example embodiments, if the number of first combinations reaches 1000, and if the second time is greater than a time by which the picker tool 200 places a semiconductor package on the test socket unit 300 and then moves to a pickup position, or if there is a stop request for a time calculation process according to the second method, the calculator 222 may end the time calculation process according to the second method.

The calculator 222 may calculate a first suitability for each of the plurality of combinations belonging to the first set.

The first suitability may be the inverse value of the total time taken for the picker tool 200 to move to the first tray 110, pick up the remaining semiconductor packages 10*a*, move to the test socket unit 300, and place the picked remaining semiconductor packages 10*a* on the test socket unit 300.

The pick and place time T may be represented by Equation (1) described above according to some example embodiments.

Because the first suitability is the inverse value of the pick and place time T, the first suitability may increase as the pick and place time T decreases. Therefore, the first suitability of the nth combination having the shortest pick and place time T is the greatest.

The calculator 222 may generate a second set consisting of at least one new combination by modifying the plurality of combinations belonging to the first set and calculate a second suitability for each of the at least one new combination belonging to the second set.

The calculator 222 may generate the second set by using the genetic algorithm to generate a new combination from combinations belonging to the first set. The calculator 222 may generate the second set from the first set by using, for example, the selection, crossover, and mutation operators of the genetic algorithm.

The second set may include the second-1 set and the second-2 set. The second-1 set may include combinations generated by selection and crossover, and the second-2 set may include combinations generated by mutating the combinations belonging to the second-1 set.

A process of generating the second-1 set and the second-2 set by using the selection, crossover, and mutation operators is as described above according to some example embodiments.

The calculator 222 may select two combinations in a higher selection probability order from among the plurality of combinations belonging to the first set and generate the second-1 set including combinations newly generated by exchanging second numbers between the selected two combinations.

The calculator 222 may also select two combinations in a suitability order from among the other combinations belonging to the first set, generate new combinations by exchanging second numbers between the selected two combinations, and generate the second-1 set including the new combinations. The second-1 set is as described above.

The calculator 222 may generate the second-2 set including other combinations by exchanging second numbers in the newly generated combinations. The second-1 set differs from the second-2 set in that the second-1 set includes combinations generated by exchanging second numbers between two combinations selected from the first set, whereas the second-2 set includes combinations each generated by exchanging second numbers matched to first numbers within one combination belonging to the second-1 set. For example, it may be considered that the second-1 set is generated by the crossover operator and the second-2 set is generated by the mutation operator. The second-2 set is as described above according to some example embodiments.

The calculator 222 may calculate the pick and place time T described above for each of the combinations belonging to the second set (e.g., the second-1 set and the second-2 set) generated from the first set and calculate a second suitability by obtaining the inverse value of the pick and place time T.

The selector 223 may compare the first suitabilities of the plurality of combinations belonging to the first set to the second suitabilities of the combinations belonging to the second set and select a combination having the highest suitability. Because a suitability is the inverse value of a pick and place time, a combination having the highest suitability means a combination having the shortest pick and place time.

The adjuster 224 may control the picker tool 200 to pick up the remaining semiconductor packages 10*a* according to the method selected by the selector 223.

According to some example embodiments, before picking up the remaining semiconductor packages 10*a* in the first tray 110, pick and place times may be calculated by virtual simulation according to the first method for a search using the maximum number of remaining semiconductor packages 10*a* picked up as priority and the second method using the genetic algorithm, and the remaining semiconductor packages 10*a* may be picked up and placed according to a method taking the shortest time, thereby reducing a process time.

Figure 7:
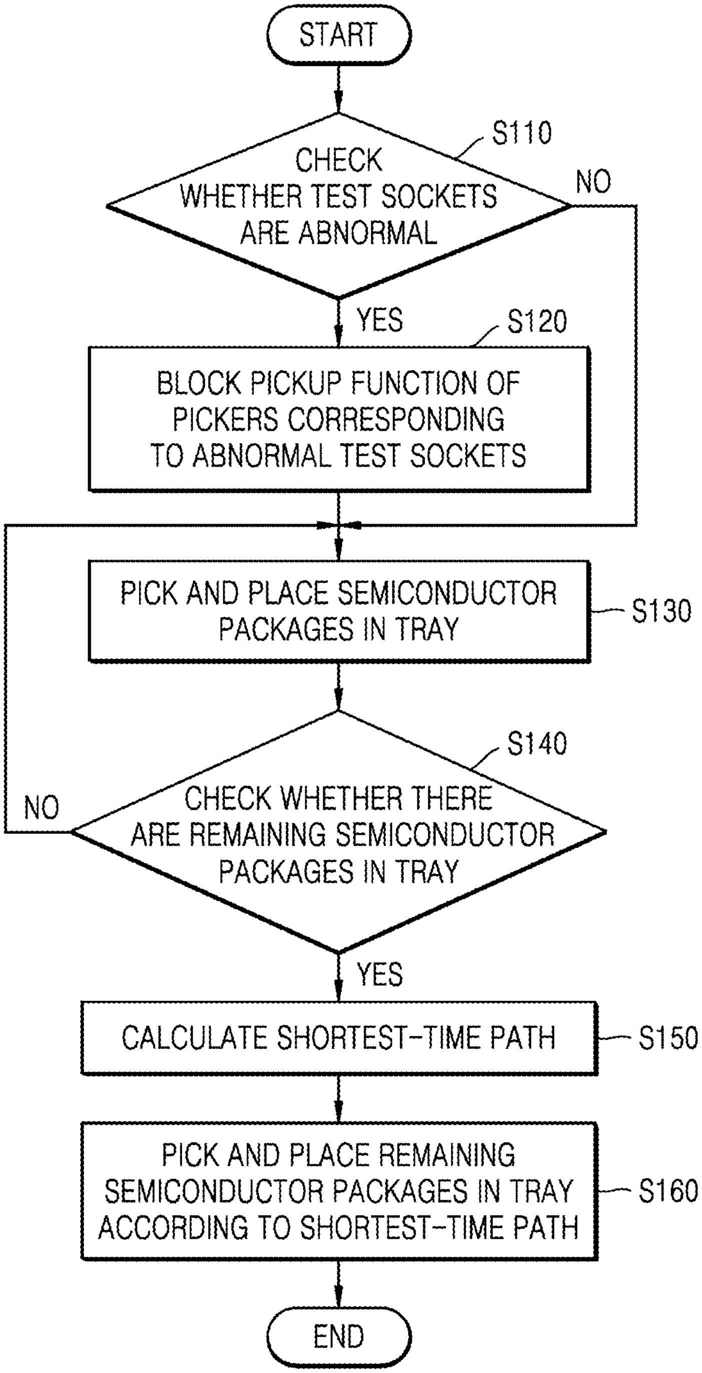
FIG. 7 is a flowchart schematically illustrating a pick and place method according to some example embodiments.

FIG. 7 is a flowchart schematically illustrating a pick and place method according to some example embodiments.

Referring to FIG. 7, in the pick and place method according to some example embodiments, in operation S110, the checker 221 may check whether test sockets are abnormal. For example, if there are abnormal test sockets among the test sockets (YES in operation S110), as described above, before pick-and-place is performed by the picker tool 200, the checker 221 may check whether the plurality of test sockets 310 of the test socket unit 300 are normal, and if there are abnormal test sockets 310*a* among the plurality of test sockets 310 (YES in operation S110), the checker 221 may block the pickup function of the pickers 210*a* of the picker tool 200 corresponding to the abnormal test sockets 310*a* in operation S120. While blocking the pickup function of the pickers 210*a*, the picker tool 200 may pick up semiconductor packages from the first tray 110 and place the picked semiconductor packages on the test socket unit 300 in operation S130. As described herein, when an operation is described to be performed "by" performing additional operations, it will be understood that the operation may be performed "based on" the additional operations, which may include performing said additional operations alone or in combination with other further additional operations.

In some example embodiments, if there are no abnormal test sockets among the plurality of test sockets 310 (NO in operation S110), the picker tool 200 may pick up semiconductor packages from the first tray 110 and place the picked semiconductor packages on the test socket unit 300 in operation S130.

After picking and placing the semiconductor packages, in operation S140, the checker 221 may check whether there are remaining semiconductor packages 10*a* in the first tray 110.

If it is determined that there are no remaining semiconductor packages 10*a* remaining in the first tray 110 without being transferred (NO in operation S140), in operation S130, semiconductor packages in another tray may be picked and placed.

If it is determined that there are remaining semiconductor packages 10*a* remaining in the first tray 110 without being transferred (YES in operation S140), the shortest-time path along which the picker tool 200 is able to pick and place the remaining semiconductor packages 10*a* may be calculated in operation S150.

Thereafter, the remaining semiconductor packages 10*a* in the first tray 110 may be picked and placed along the shortest-time path in operation S160.

The shortest-time path may be calculated according to the first method and the second method.

Figure 8:
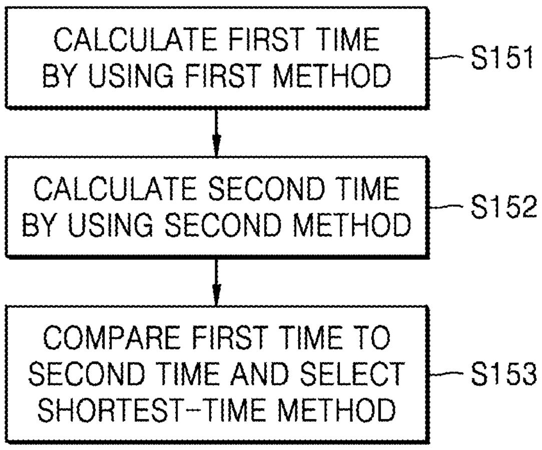
FIG. 8 is a flowchart schematically illustrating an operation, in FIG. 7, of calculating a shortest-time path according to some example embodiments.

FIG. 8 is a flowchart illustrating the operation of calculating the shortest-time path according to some example embodiments.

Referring to FIG. 8, the controller 220 may calculate the pick and place time of the remaining semiconductor packages 10*a*, e.g., the first time, by using the first method in operation S151.

Next, the controller 220 may calculate the pick and place time of the remaining semiconductor packages 10*a*, e.g., the second time, by using the second method in operation S152.

As described above, according to some example embodiments, the first method is a method of selecting an optimal position where the picker tool 200 is able to pick up the maximum number of remaining semiconductor packages 10*a* at once from the first tray 110, moving the picker tool 200 to the optimal position, and allowing the picker tool 210 to pick up the remaining semiconductor packages 10*a*.

The second method is a method by which the picker tool 200 picks up remaining semiconductor packages 10*a* on the first tray 110 by using the selection, crossover, and mutation operators of the genetic algorithm.

Next, in operation S153, the controller 220 may compare the first time calculated according to the first method to the second time calculated according to the second method and select a method taking the shortest time between the first time and the second time.

Figure 9:
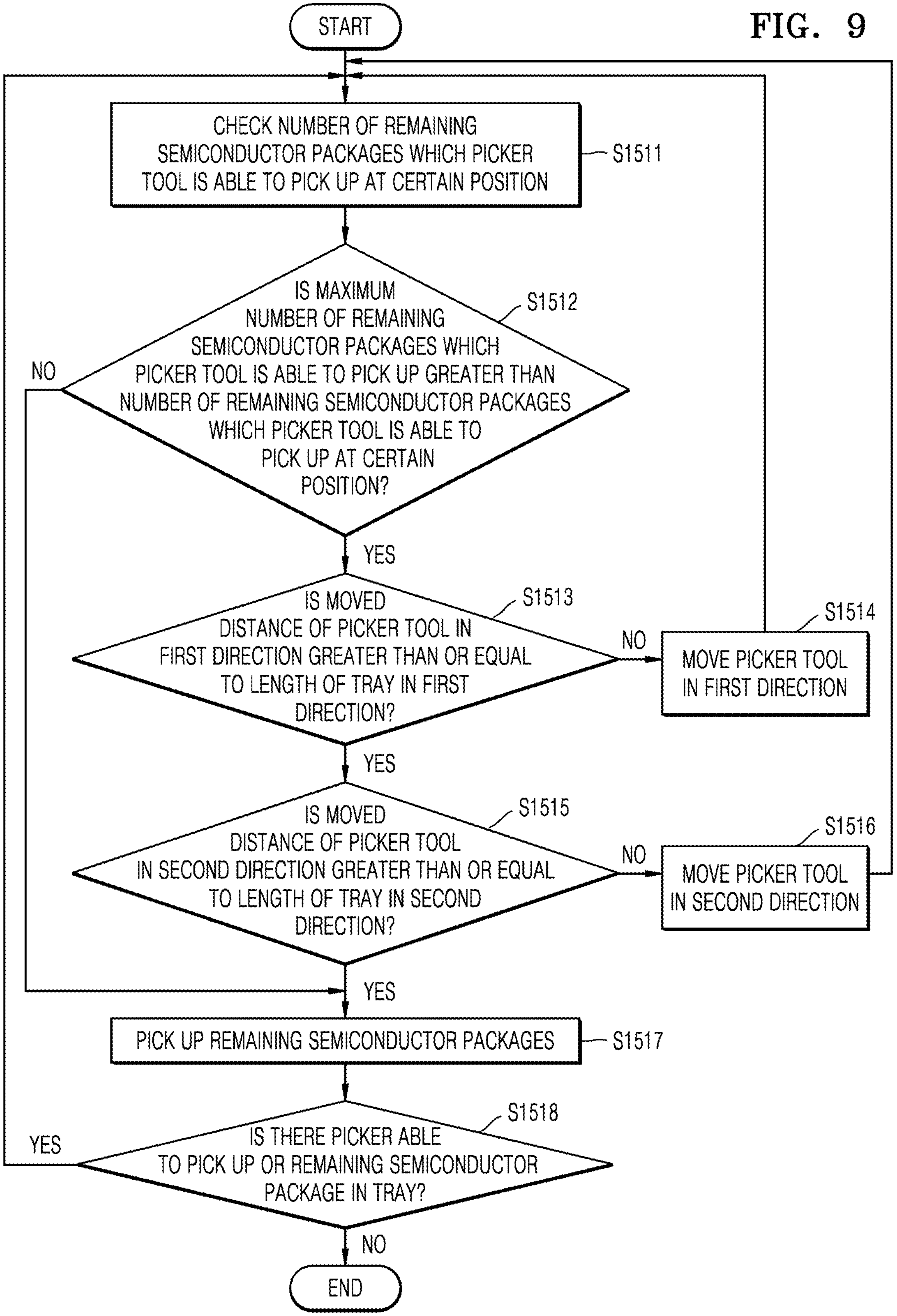
FIG. 9 is a flowchart schematically illustrating an operation, in FIG. 8, of calculating a first time by using the first method according to some example embodiments.

FIG. 9 is a flowchart schematically illustrating the operation, in FIG. 8, of calculating the first time by using the first method according to some example embodiments.

Referring to FIG. 9, in operation 1511, the controller 220 may check the number of remaining semiconductor packages 10*a* which the picker tool 200 is able to pick up at a certain position.

Next, in operation S1512, the controller 220 may compare the number of remaining semiconductor packages 10*a* which the picker tool 200 is able to pick up at the certain position to the maximum number of remaining semiconductor packages 10*a* which the picker tool 200 is able to pick up. As described above, in some example embodiments, the controller 220 may set the number of pickers 210*a* having a blocked pickup function as the maximum number of remaining semiconductor packages 10*a* which the picker tool 200 is able to pick up.

If the maximum number of remaining semiconductor packages 10*a* which the picker tool 200 is able to pick up is greater than the number of remaining semiconductor packages 10*a* which the picker tool 200 is able to pick up at the current position, the controller 220 may move the picker tool 200 in the first direction D1 or the second direction D2 in operations S1513, S1514, S1515, and S1516.

Before moving the picker tool 200 in the first direction D1 or the second direction D2, if the maximum number of remaining semiconductor packages 10*a* which the picker tool 200 is able to pick up is greater than the number of remaining semiconductor packages 10*a* which the picker tool 200 is able to pick up at the current position, in operation S1513, the controller 220 may compare a moved distance of the picker tool 200 in the first direction D1 to the length of the first tray 110 in the first direction D1.

If the moved distance of the picker tool 200 in the first direction D1 is less than the length of the first tray 110 in the first direction D1 (NO in operation S1513), the controller 220 may move the picker tool 200 in the first direction D1 in operation S1514.

If the moved distance of the picker tool 200 in the first direction D1 is greater than or equal to the length of the first tray 110 in the first direction D1 (YES) in operation S1513, in operation S1515, the controller 220 may compare a moved distance of the picker tool 200 in the second direction D2 to the length of the first tray 110 in the second direction D2. If the moved distance of the picker tool 200 in the second direction D2 is less than the length of the first tray 110 in the second direction D2 (NO) in S1515, the controller 220 may move the picker tool 200 in the second direction D2 in operation S1516.

If the moved distance of the picker tool 200 in the second direction D2 is greater than or equal to the length of the first tray 110 in the second direction D2 (YES) in S1515, the picker tool 200 may pick up remaining semiconductor packages 10*a* at the current position in operation S1517.

In operation S1518, the controller 220 may check whether the pickers 210 of the picker tool 200 cannot pick up any more remaining semiconductor package 10*a* because all the pickers 210 have picked up remaining semiconductor packages 10*a* or whether there is no remaining semiconductor package 10*a* in the first tray 110. If the pickers 210 cannot pick up a remaining semiconductor package 10*a* or if there is no remaining semiconductor package 10*a*, the picker tool 200 may place the picked remaining semiconductor packages 10*a* on the test socket unit 300. However, if the pickers 210 are able to pick up a remaining semiconductor package 10*a*, or if there is a remaining semiconductor package 10*a*, operation S1511 may be performed again.

Figure 10:
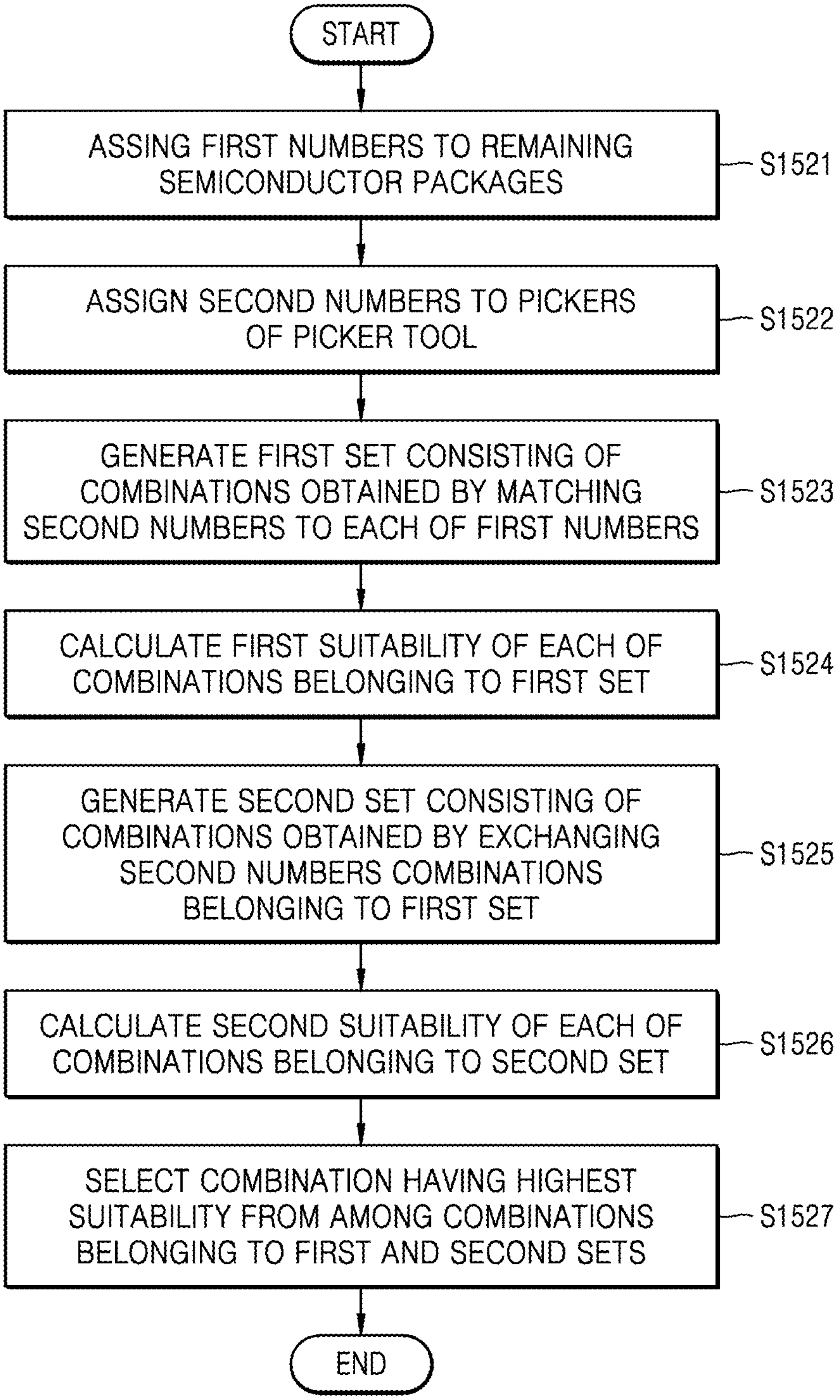
FIG. 10 is a flowchart schematically illustrating an operation, in FIG. 8, of calculating a second time using a second method according to some example embodiments.

FIG. 10 is a flowchart schematically illustrating the operation, in FIG. 8, of calculating the second time by using the second method according to some example embodiments.

Referring to FIG. 10, in operation S1521, the controller 220 may sequentially assign first numbers to the remaining semiconductor packages 10*a* in the first tray 110 from the right to the left and from the top to the bottom.

Next, in operation S1522, the controller 220 may sequentially assign second numbers to the pickers 210 of the picker tool 200 from the right to the left and from the top to the bottom. When the second numbers are assigned to the pickers 210 of the picker tool 200, the second numbers may not be assigned to the pickers 210*a* having a blocked pickup function.

Next, in operation S1523, the controller 220 may generate a plurality of combinations by matching the second numbers assigned to the pickers 210 to each of the first numbers assigned to the remaining semiconductor packages 10*a*.

Next, in operation S1524, the controller 220 may calculate a first suitability for each of the plurality of combinations belonging to a first set.

The first suitability may be the inverse value of the total time taken for the picker tool 200 to move to the first tray 110, pick up remaining semiconductor packages 10*a*, move to the test socket unit 300, and place the picked remaining semiconductor packages 10*a* on the test socket unit 300. The pick and place time T may be represented by Equation (1) described above according to some example embodiments.

Next, the controller 220 may generate a second set including at least one new combination by modifying the plurality of combinations belonging to the first set in operation S1525 and calculate a second suitability for each of the at least one new combination belonging to the second set in operation S1526.

In operation S1527, the controller 220 may select a combination having the highest suitability among the combinations belonging to the first and second sets. A time taken using the combination having the highest suitability may be a pick and place time according to the second method.

Figure 11:
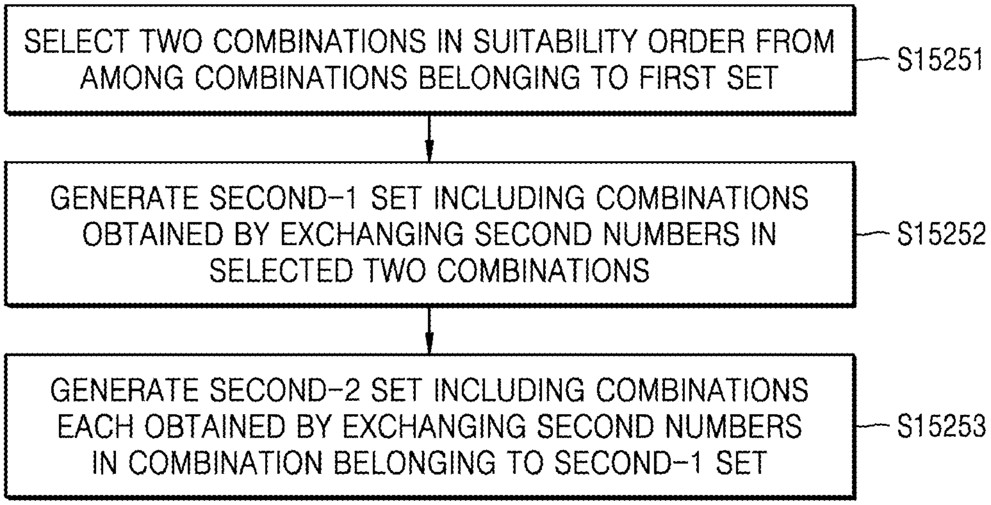
FIG. 11 is a flowchart schematically illustrating an operation, in FIG. 10, of generating a second set according to some example embodiments.

FIG. 11 is a flowchart schematically illustrating the operation, in FIG. 10, of generating the second set according to some example embodiments.

Referring to FIG. 11, the controller 220 may select two combinations in a higher selection probability order from among the plurality of combinations belonging to the first set in operation S15251 and generate a second-1 set including combinations newly generated by exchanging second numbers between the selected two combinations in operation S15252.

The controller 220 may also select two combinations in a suitability order from among the other combinations belonging to the first set, generate new combinations by exchanging second numbers between the selected two combinations, and generate the second-1 set including the new combinations. The second-1 set is as described above.

Next, in operation S15253, the controller 220 may generate a second-2 set including other combinations by exchanging second numbers in the newly generated combinations. The second-1 set differs from the second-2 set in that the second-1 set includes combinations generated by exchanging second numbers between two combinations selected from the first set, whereas the second-2 set includes combinations each generated by exchanging second numbers matched to first numbers within one combination belonging to the second-1 set. It may be considered that the second-1 set is generated by the crossover operator and the second-2 set is generated by the mutation operator. The second-2 set is as described above according to some example embodiments.

The controller 220 may calculate the pick and place time T described above for each of the combinations belonging to the second set (the second-1 set and the second-2 set) generated from the first set and calculate a second suitability by obtaining the inverse value of the pick and place time T.

While the present inventive concept have been shown and described with reference to some example embodiments thereof, it will be understood that various changes in form and details may be made therein without departing from the spirit and scope of the following claims.

What is claimed is:

1. A pick and place apparatus, comprising:

a first tray configured to accommodate a plurality of semiconductor packages;

a test socket unit having a plurality of test sockets each configured to test a semiconductor package;

a picker tool having a plurality of pickers configured to pick up corresponding semiconductor packages from the first tray and place the picked semiconductor packages on the plurality of test sockets; and a controller configured to check whether the plurality of test sockets are normal and block a semiconductor package pickup function of a picker corresponding to an abnormal test socket, check whether there are remaining semiconductor packages remaining in the first tray without being transferred, calculate, according to a first operation and a second operation, a time the picker tool picks and places the remaining semiconductor packages, select an operation having a shortest time between a first time calculated according to the first operation and a second time calculated according to the second operation, and control the picker tool to pick up the remaining semiconductor packages according to the selected operation.

2. The pick and place apparatus of claim 1, wherein the first time the controller is configured to calculate according to the first operation is a time taken until the controller compares a number of remaining semiconductor packages the picker tool is configured to pick up at a certain position to a maximum number of remaining semiconductor packages the picker tool is configured to pick up, the controller moves the picker tool in a first direction or a second direction if the maximum number of remaining semiconductor packages the picker tool is configured to pick up is greater than the number of remaining semiconductor packages the picker tool is configured to pick up at the position, the picker tool picks up the remaining semiconductor packages if the maximum number of remaining semiconductor packages the picker tool is configured to pick up is a same as the number of remaining semiconductor packages the picker tool is configured to pick up at the position, and pickers of the picker tool cannot pickup any more remaining semiconductor packages as a result of all the pickers having picked up the remaining semiconductor packages or there is no remaining semiconductor package in the first tray.

3. The pick and place apparatus of claim 2, wherein the maximum number of remaining semiconductor packages the picker tool is configured to pick up is same as a number of pickers having a blocked pickup function.

4. The pick and place apparatus of claim 2, wherein, if a moved distance of the picker tool in the first direction is less than a length of the first tray in the first direction, the picker tool is configured to move in the first direction with respect to the first tray, and if the moved distance of the picker tool in the first direction is greater than or equal to the length of the first tray in the first direction, the picker tool is configured to move in the second direction perpendicular to the first direction with respect to the first tray.

5. The pick and place apparatus of claim 1, wherein the second time the controller is configured to calculate according to the second operation is a time taken until the controller calculates a suitability of each of a plurality of combinations belonging to a first set consisting of the plurality of combinations obtained based on matching second numbers respectively assigned to pickers of the picker tool to first numbers respectively assigned to the remaining semiconductor packages, the controller calculates a suitability of each of combinations belonging to a second set consisting of combinations obtained based on exchanging second numbers of combinations belonging to the first set, and the pickers of the picker tool cannot pick up any more remaining semiconductor package as a result of all the pickers having picked the remaining semiconductor packages according to a combination having a highest suitability among the combinations belonging to the first set and the second set.

6. The pick and place apparatus of claim 5, wherein the suitability is an inverse value of a pick and place time, and a pick and place time T is $$T = S_c \times (M_1 + S_t + M_2) + \sum_{i=1}^{n}(P_{t_i}),$$

where $S_c$ is a number of place times, $S_t$ is a place time, $P_t$ is a pickup time, $M_1$ is a moving time to the test socket unit, and $M_2$ is a moving time to the first tray.

7. The pick and place apparatus of claim 5, wherein the second set comprises a second-1 set and a second-2 set, and the controller is further configured to calculate a selection probability of each of the plurality of combinations belonging to the first set, select two combinations in a higher selection probability order from the first set, generate the second-1 set including combinations generated based on exchanging second numbers between the selected two combinations, and generate the second-2 set including combinations each generated based on exchanging second numbers matched to first numbers in a combination belonging to the second-1 set.

8. The pick and place apparatus of claim 7, wherein the controller is further configured to calculate the selection probability based on dividing a suitability of each of combinations by a sum of the suitabilities of the combinations.

9. The pick and place apparatus of claim 5, wherein, if the second time is greater than a time the picker tool is configured to place the remaining semiconductor packages on the test socket unit and then move to a pickup position or if a stop request for a process of calculating the second time according to the second operation is received, the controller is further configured to end the process of calculating the second time according to the second operation.

10. A pick and place apparatus, comprising:

a plurality of test sockets configured to test a plurality of semiconductor packages accommodated in a tray and transferred to the plurality of test sockets;

a plurality of pickers configured to pick and place the plurality of semiconductor packages; and a controller configured to block a function of picking and placing a semiconductor package with respect to pickers corresponding to test sockets having an abnormal test function among the plurality of test sockets, select an operation taking a less pick and place time between a first operation and a second operation capable of picking and placing remaining semiconductor packages remaining in the tray as a result of the pick and place function of the pickers being blocked while pickers corresponding to test sockets having a normal test function pick and place semiconductor packages accommodated in the tray, the first operation being an operation of searching for a position from which a maximum number of remaining semiconductor packages are picked up at once, and the second operation being an operation of picking up the remaining semiconductor packages on the tray based on a genetic algorithm.

11. The pick and place apparatus of claim 10, wherein the first operation comprises:

checking a number of remaining semiconductor packages the pickers are configured to pick up at a position above the tray;

moving the pickers in a first direction or a second direction if a maximum number of remaining semiconductor packages the pickers are configured to pick up is greater than a number of remaining semiconductor packages the pickers are configured to pick up at the position; and controlling the pickers to pick up the remaining semiconductor packages if the maximum number of remaining semiconductor packages the pickers are configured to pick up is a same as the number of remaining semiconductor packages the pickers are configured to pick up at the position.

12. The pick and place apparatus of claim 11, wherein the second operation comprises:

assigning first numbers to the remaining semiconductor packages, respectively;

assigning second numbers to the pickers, respectively;

generating a first set consisting of a plurality of combinations generated based on matching the second numbers to each of the first numbers;

calculating a suitability of each of the plurality of combinations belonging to the first set;

generating a second set consisting of combinations generated based on exchanging second numbers of combinations belonging to the first set; and calculating a suitability of each of the combinations belonging to the second set, wherein the suitability is an inverse value of a pick and place time, and a pick and place time T is $$T = S_c \times (M_1 + S_t + M_2) + \sum_{i=1}^{n} (P_{t_i}),$$

where $S_c$ is a number of place times, $S_t$ is a place time, $P_t$ is a pickup time, $M_1$ is a moving time to the test sockets, and $M_2$ is a moving time to the tray.

13. A pick and place apparatus, comprising:

a first tray configured to accommodate a plurality of semiconductor packages;

a test socket unit having a plurality of test sockets each configured to test a semiconductor package;

a second tray configured to accommodate semiconductor packages confirmed as good products as a test result;

a third tray configured to accommodate semiconductor packages confirmed as bad products as a test result;

a picker tool having a plurality of pickers configured to pick up semiconductor packages from the first tray and place the picked semiconductor packages on the plurality of test sockets, and pick up the semiconductor packages having ended the test from the plurality of test sockets and place the picked semiconductor packages on the second tray or the third tray; and a controller configured to check whether the plurality of test sockets are normal, block a semiconductor package pickup function of pickers corresponding to abnormal test sockets, check whether there are remaining semiconductor packages remaining in the first tray without being transferred, calculate, according to a first operation and a second operation, a time the picker tool is configured to pick the remaining semiconductor packages, select an operation taking a shortest time between a first time calculated according to the first operation and a second time calculated according to the second operation, and control the picker tool to pick up the remaining semiconductor packages according to the selected operation.

14. The pick and place apparatus of claim 13, wherein the controller is configured to compare a number of remaining semiconductor packages the picker tool is configured to pick up at a certain position to a maximum number of remaining semiconductor packages the picker tool is configured to pick up, move the picker tool in a first direction or a second direction if the maximum number of remaining semiconductor packages the picker tool is configured to pick up is greater than the number of remaining semiconductor packages the picker tool is configured to pick up at the position, control the picker tool to pick up the remaining semiconductor packages if the maximum number of remaining semiconductor packages the picker tool is configured to pick up is a same as the number of remaining semiconductor packages the picker tool is configured to pick up at the position, and calculate the first time taken until pickers of the picker tool cannot pickup any more remaining semiconductor package as a result of all the pickers having picked up the remaining semiconductor packages or there are no remaining semiconductor package in the first tray.

15. The pick and place apparatus of claim 14, wherein the controller is further configured to set the maximum number of remaining semiconductor packages the picker tool is configured to pick up as a number of pickers having a blocked pickup function.

16. The pick and place apparatus of claim 14, wherein the controller is further configured to generate a first set consisting of a plurality of combinations obtained based on matching second numbers respectively assigned to pickers of the picker tool to first numbers respectively assigned to the remaining semiconductor packages, calculate a suitability of each of the plurality of combinations belonging to the first set, generate a second set consisting of combinations generated based on exchanging second numbers of combinations belonging to the first set, calculate a suitability of each of the combinations belonging to the second set, and calculate the second time taken until the pickers of the picker tool cannot pick up any more remaining semiconductor package as a result of all the pickers having picked remaining semiconductor packages according to a combination having a highest suitability among the combinations belonging to the first set and the second set.

17. The pick and place apparatus of claim 16, wherein the suitability is an inverse value of a pick and place time, and a pick and place time T is $$T = S_c \times (M_1 + S_t + M_2) + \sum_{i=1}^{n} (P_{t_i}),$$

where $S_c$ is a number of place times, $S_t$ is a place time, $P_t$ is a pickup time, $M_1$ is a moving time to the test socket unit, and $M_2$ is a moving time to the first tray.

18. The pick and place apparatus of claim 16, wherein the second set comprises a second-1 set and a second-2 set, and the controller is further configured to calculate a selection probability of each of the plurality of combinations belonging to the first set, select two combinations in a higher selection probability order from the first set, generate the second-1 set including combinations generated based on exchanging second numbers between the selected two combinations, and generate the second-2 set including combinations each generated based on exchanging second numbers matched to first numbers in a combination belonging to the second-1 set.

19. The pick and place apparatus of claim 17, wherein the controller is further configured to calculate a selection probability based on dividing the suitability of each of the combinations in a same set by a sum of the suitabilities of the combinations.

20. The pick and place apparatus of claim 17, wherein, if the second time is greater than a time the picker tool is configured to place the remaining semiconductor packages on the test socket unit and then move to a pickup position or if a stop request for a process of calculating the second time according to the second operation is received, the controller is further configured to end the process of calculating the second time according to the second operation.

* * * * *